(12) United States Patent
Horn et al.

(10) Patent No.: US 10,356,661 B2
(45) Date of Patent: Jul. 16, 2019

(54) ADMISSION CONTROL AND LOAD BALANCING

(71) Applicant: QUALCOMM Incorporated, San Diego, CA (US)

(72) Inventors: Gavin Bernard Horn, La Jolla, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/652,430

(22) Filed: Jul. 18, 2017

(65) Prior Publication Data

US 2017/0318498 A1 Nov. 2, 2017

Related U.S. Application Data

(62) Division of application No. 14/599,144, filed on Jan. 16, 2015, now Pat. No. 9,749,902.
(Continued)

(51) Int. Cl.
*H04W 28/08* (2009.01)
*H04L 12/26* (2006.01)
(Continued)

(52) U.S. Cl.
CPC ............ *H04W 28/08* (2013.01); *H04L 43/16* (2013.01); *H04L 47/743* (2013.01); *H04L 47/801* (2013.01); *H04W 24/08* (2013.01)

(58) Field of Classification Search
None
See application file for complete search history.

(56) References Cited

U.S. PATENT DOCUMENTS

| 7,369,520 B2 | 5/2008 | Luoma et al. |
| 7,680,050 B1 | 3/2010 | Sindhu |

(Continued)

FOREIGN PATENT DOCUMENTS

| CN | 101076979 A | 11/2007 |
| CN | 102904791 A | 1/2013 |

(Continued)

OTHER PUBLICATIONS

Taiwan Search Report—TW104126291—TIPO—dated Nov. 13, 2017.

(Continued)

*Primary Examiner* — Anh Ngoc M Nguyen
(74) *Attorney, Agent, or Firm* — Qualcomm IP Dept.; James Hunt Yancey, Jr.

(57) ABSTRACT

Certain aspects of the present disclosure relate to methods and apparatus for wireless communication, and more particularly, to methods and apparatus to enable a node to be aware of active services and context for a mobile device in order to determine the load balancing and admission control for the services. For example, in certain aspects, a mobile device for managing at least one data flow between a core network and the mobile device may determine whether at least one of the data flow or a service related to the data flow should be reported and send a report to a first node based on the determination. The report may identify at least one of the data flow or service and indicates a packet data network (PDN) connection or bearer associated with the service or data flow.

13 Claims, 17 Drawing Sheets

Related U.S. Application Data

(60) Provisional application No. 62/039,221, filed on Aug. 19, 2014.

(51) Int. Cl.
*H04L 12/927* (2013.01)
*H04W 24/08* (2009.01)
*H04L 12/911* (2013.01)

(56) References Cited

U.S. PATENT DOCUMENTS

| | | |
|---|---|---|
| 7,792,025 B2 | 9/2010 | Segel et al. |
| 7,916,651 B2 | 3/2011 | Pathak et al. |
| 8,300,598 B2* | 10/2012 | Kim .............. H04W 36/26 370/328 |
| 8,867,471 B2 | 10/2014 | Yuan et al. |
| 2003/0152095 A1 | 8/2003 | Foore et al. |
| 2004/0109423 A1* | 6/2004 | Sayeedi ............ H04W 76/15 370/328 |
| 2005/0238049 A1 | 10/2005 | Delregno |
| 2007/0253405 A1* | 11/2007 | Willis ............ H04W 76/021 370/352 |
| 2008/0096526 A1 | 4/2008 | Miettinen et al. |
| 2008/0235379 A1 | 9/2008 | Monette |
| 2008/0252440 A1 | 10/2008 | Meiner |
| 2009/0135766 A1 | 5/2009 | Vitebsky et al. |
| 2009/0252145 A1 | 10/2009 | Meylan et al. |
| 2010/0103833 A1 | 4/2010 | Englund et al. |
| 2010/0150016 A1 | 6/2010 | Barr |
| 2010/0189070 A1 | 7/2010 | Shi et al. |
| 2011/0244874 A1 | 10/2011 | Fodor et al. |
| 2011/0249608 A1 | 10/2011 | Fischer |
| 2012/0051296 A1 | 3/2012 | Kokku et al. |
| 2012/0099517 A1 | 4/2012 | Hayashi |
| 2012/0250509 A1 | 10/2012 | Leung et al. |
| 2012/0278472 A1 | 11/2012 | Ellis et al. |
| 2013/0021933 A1 | 1/2013 | Kovvali et al. |
| 2013/0021962 A1 | 1/2013 | Hu et al. |
| 2013/0028223 A1 | 1/2013 | Kim et al. |
| 2013/0042011 A1 | 2/2013 | Sugizaki et al. |
| 2013/0100862 A1 | 4/2013 | Huang et al. |
| 2014/0093071 A1 | 4/2014 | Qiang |
| 2014/0106759 A1* | 4/2014 | Geng .............. H04W 36/04 455/444 |
| 2014/0195655 A1 | 7/2014 | Jha |
| 2015/0031367 A1* | 1/2015 | Singh ............ H04W 36/08 455/437 |
| 2015/0094073 A1 | 4/2015 | Peng |
| 2015/0131538 A1 | 5/2015 | Ben-Nun et al. |
| 2015/0350932 A1* | 12/2015 | Da Silva ............ H04W 76/18 370/225 |
| 2016/0057658 A1 | 2/2016 | Horn et al. |
| 2016/0174211 A1 | 6/2016 | Gao et al. |
| 2016/0219481 A1* | 7/2016 | Wang ................ H04W 28/085 |
| 2017/0048751 A1* | 2/2017 | Rasanen ............ H04W 28/085 |
| 2017/0318499 A1 | 11/2017 | Horn et al. |
| 2017/0318500 A1 | 11/2017 | Horn et al. |

FOREIGN PATENT DOCUMENTS

| | | |
|---|---|---|
| EP | 1400145 B1 | 9/2007 |
| EP | 1871057 A1 | 12/2007 |
| EP | 2323314 A1 | 5/2011 |
| EP | 2087657 B1 | 1/2012 |
| EP | 2584742 A1 | 4/2013 |
| EP | 2706703 A2 | 3/2014 |
| EP | 2728818 A1 | 5/2014 |
| JP | 2002502206 A | 1/2002 |
| JP | 2009542058 A | 11/2009 |
| JP | 2013524680 A | 6/2013 |
| JP | 2015519821 A | 7/2015 |
| JP | 2015523008 A | 8/2015 |
| SG | 183064 A1 | 8/2012 |
| TW | 201304571 A | 1/2013 |
| WO | WO-9939528 A1 | 8/1999 |
| WO | WO-2005002264 A1 | 1/2005 |
| WO | WO-2007147431 A1 | 12/2007 |
| WO | WO-2008038231 A2 | 4/2008 |
| WO | WO-2009123514 A1 | 10/2009 |
| WO | 2012106820 A1 | 8/2012 |
| WO | 2013164105 A1 | 11/2013 |
| WO | 2013181843 A1 | 12/2013 |
| WO | WO-2014016280 A1 | 1/2014 |
| WO | 2014061001 A1 | 4/2014 |
| WO | 2014113190 A1 | 7/2014 |

OTHER PUBLICATIONS

International Preliminary Report on Patentability—PCT/US2015/044425—dated Nov. 15, 2016.
Article 34 and Chapter II Demand as filed May 17, 2016 in response to the International Search Report and Written Opinion dated Feb. 25, 2016.
International Search Report and Written Opinion—PCT/US2015/044425—ISA/EPO—dated Feb. 25, 2016.
Partial International Search Report—PCT/US2015/044425—ISA/EPO—dated Oct. 19, 2015.
European Search Report—EP18181954—Search Authority—Munich—dated Aug. 3, 2018.

* cited by examiner

ADMISSION CONTROL AND LOAD BALANCING

This application is a divisional application of U.S. patent application Ser. No. 14/599,144 entitled "ADMISSION CONTROL AND LOAD BALANCING", filed Jan. 16, 2015, which claims benefit of U.S. Provisional Patent Application Ser. No. 62/039,221, entitled "ADMISSION CONTROL AND LOAD BALANCING," filed Aug. 19, 2014, which are assigned to the assignee of the present application and hereby expressly incorporated by reference herein in their entirety.

FIELD

The present disclosure relates generally to wireless communication, and more particularly, to methods and apparatus for routing data between a mobile device and core network using different communication links.

BACKGROUND

Wireless communication systems are being developed with the goal of enabling new services and devices, which will offer new user experiences. One approach to achieve this is to leverage multiple existing radio access technologies (RATs), for example, using a combination of features from wireless wide area networks (e.g., 3G and LTE) and wireless local area networks (e.g., based on WiFi and millimeter wave (mmW)). This approach may help speed development and take advantage of different benefits provided by the different RATs.

One challenge with a system that utilizes multiple RATs is how to optimally route data between a core network and a user, given the different paths offered by the different RATs.

SUMMARY

Certain aspects of the present disclosure provide a method of wireless communication by a mobile device for managing at least one data flow between a core network and the mobile device. The method generally includes determining whether at least one of the data flow or a service related to the data flow should be reported, and sending a report to a first node based on the determination, wherein the report identifies at least one of the data flow or service and indicates a packet data network (PDN) connection or bearer associated with the service or data flow.

Certain aspects of the present disclosure provide a method of wireless communication by a second node for managing at least one data. The method generally includes determining a data flow is active for a bearer or a packet data network (PDN) connection, deciding, based on one or more service requirements of the data flow, whether to serve the data flow at the second node or a first node, and sending, to the first node, a request for admission of the data flow.

Certain aspects of the present disclosure provide a method of wireless communication by a first node for performing admission control on at least one data flow. The method generally includes receiving, from a second node, a request for admission of the at least one data flow for a bearer comprising a plurality of data flows, evaluating availability of resources at the first node to serve the at least one data flow with the bearer, and indicating to the second node whether admission is granted to the at least one data flow based at least in part on the evaluated availability of resources.

Certain aspects of the present disclosure provide a method of wireless communication by a first node. The method generally includes determining that at least one data flow is active for an existing bearer or a new packet data network (PDN) connection, wherein the data flow has an associated aggregation layer of a protocol stack of the first node, evaluating the availability of resources at the first node to serve the data flow, wherein the evaluating relates to resources managed by at least one protocol layer that is below the associated aggregation layer of a protocol stack of the first node, and transmitting, to a second node, a message indicating the availability of resources at the first node for data flows associated with the second node and for data flows not associated with the second node.

Aspects also provide various apparatus, systems, computer program products, and processing systems for performing the operations described above.

DETAILED DESCRIPTION

Figure 1:
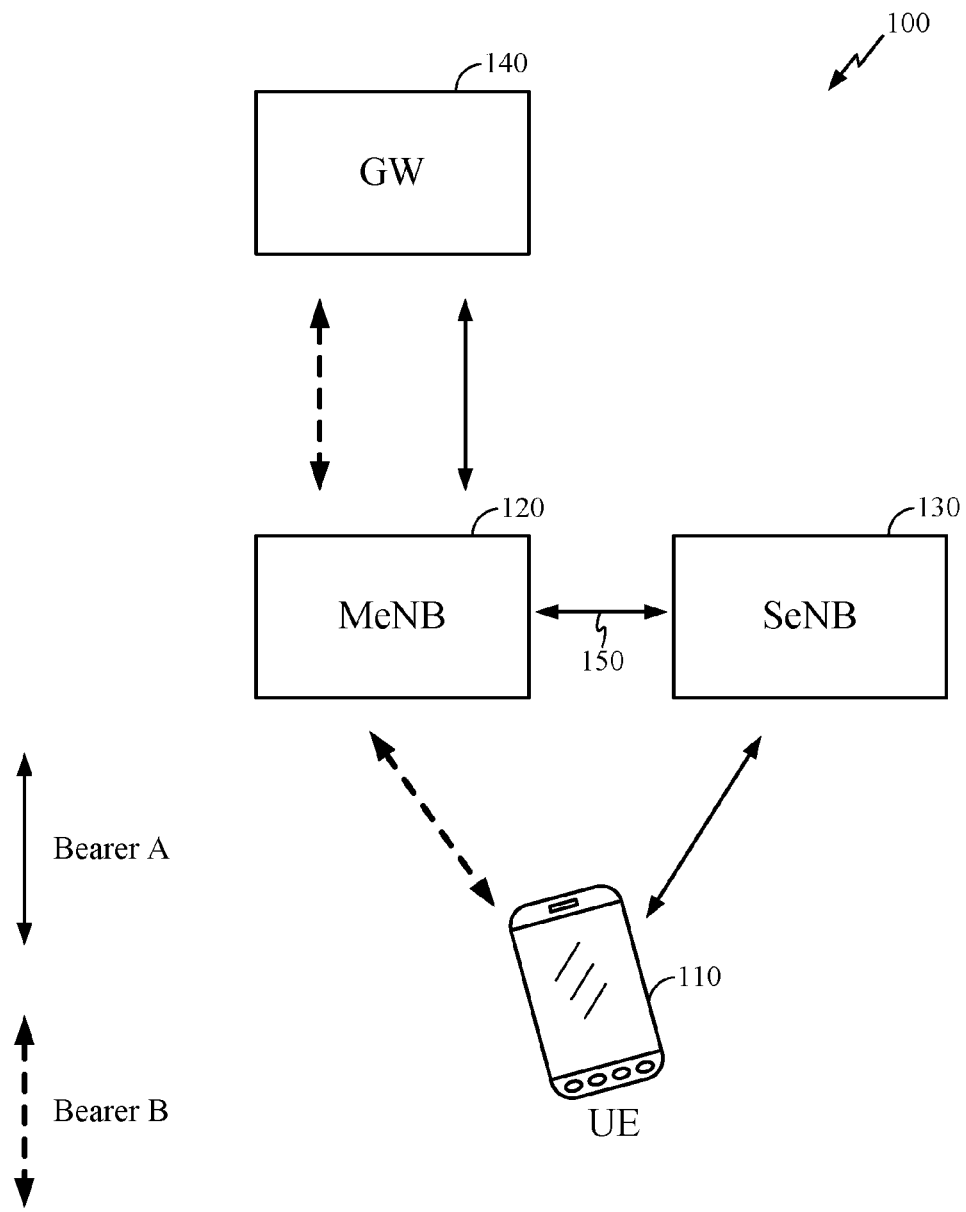
FIG. 1 illustrates an example wireless environment, in accordance with certain aspects of the present disclosure.

Aspects of the present disclosure provide techniques that may be used to route data between a core network and a user equipment (UE) connected via multiple radio access technologies (RATs). In some cases, an entity making admission control or load balancing decisions (to routed data between the multiple RATs) may consider which particular services are activated.

Aspects of the present disclosure may be applied to a wide variety of different types of mobile devices communicating via a wide variety of different RATs. Different terminology may be used to refer to mobile devices. For example, in some cases depending on the RAT(s) supported thereby, a mobile device may be referred to as a wireless device, user terminal (UT), access terminal (AT), user equipment (UE), station, mobile station, wireless station, wireless node, or the like. Similarly, different terminology may be used to refer to a base station that provides services to a mobile device, such as access to a core network. For example, in some cases depending on the RAT(s) supported thereby, a base station may be referred to as an access point (AP), a node B, an enhanced Node B (eNodeB), or simply an eNB.

In certain examples that follow, a mobile device is referred to as a UE and base station are referred to as eNBs. Such references are not meant to limit aspects of the present disclosure to any particular RAT or RATs, but are merely to help describe illustrative examples meant to facilitate understanding.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Environment

FIG. 1 illustrates an example wireless environment 100, in which aspects of the present disclosure may be utilized to manage data flows between a core network and a wireless device, such as UE 110.

As illustrated, UE 110 may be capable of communicating with multiple base stations, such as a master eNodeB (MeNB) 120 and a secondary eNodeB (SeNB) 130. MeNB 120 and SeNB 130 may communicate via the same RAT or different RATs. For example, MeNB 120 may communicate via a wireless wide area network (WWAN) protocol (e.g. LTE) while SeNB 130 may communicate via a wireless local area network (WLAN) protocol (e.g., WiFi).

As used herein, the term MeNB generally refers to an eNB that terminates an S1-MME (Mobility Management Entity) control plane for the UE, while the term SeNB generally refers to an eNB serving the UE that is not the MeNB. An S1 connection may be used by the MeNB or SeNB to communicate with the core network (CN), for example via a CN gateway (GW) 140. For example, the S1 interface may include an S1-U interface, which serves the data plane between the MeNB or SeNB and the CN GW, and an S1-MME, which serves the control plane.

In certain aspects, the MeNB may be connected to one or more SeNBs to serve a UE via multi-connectivity. The MeNB and SeNB may communicate with one another via a backhaul connection 150 (e.g., an X2 connection). The backhaul connection need not be direct but may be routed through one or more intermediate nodes (e.g., an MME, an interworking gateway function, or a router). The number of SeNBs may be limited, depending on the capabilities of the UE. The MeNB may coordinate mobility and user-plane (U-plane) split procedures within the corresponding operator network. The MeNB may be considered as "access agnostic," meaning it may support any type of RAT both to serve the UE and also for managing the UE configuration of a U-plane split with one or more SeNBs. For example, an MeNB may utilize a common U-plane anchored in the operator's core network (CN) in order to enable procedures to manage the U-plane split via multiple RATs, as described herein.

The SeNB may be utilized as a source of supplemental capacity for the MeNB and may also use a different RAT (from the RAT of the MeNB) to serve the UE. According to aspects of the present disclosure, an SeNB is limited to serving a UE and in most cases may not be used to control the UE configuration of the U-plane split. Having the SeNB as a supplemental capacity for the MeNB may provide an opportunistic and energy efficient operation, which may be initiated by the UE's user or the network operator.

The SeNB may be loosely or tightly coupled with the MeNB, depending on backhaul bandwidth capabilities and latency requirements. For example, an SeNB that is considered tightly coupled with an MeNB may have the SeNB's connection to the UE substantially managed by the MeNB. On the other hand, an SeNB that is considered loosely coupled with an MeNB may leave the SeNB's connection to the UE under the control of the SeNB subject to, for example, general requirements such as Quality of Service (QoS) from the MeNB. For example, an SeNB with a high-capacity and low-latency backhaul link to an MeNB may be tightly coupled with the operations of the MeNB. The SeNB may be used as a supplemental downlink (SDL) or as an additional cell for both uplink (UL) and DL. In some cases, the SeNB may be used to help achieve supplemental mobility robustness of the MeNB, for example, for mission critical applications. For example, the SeNB may provide a redundant path for delivery of critical information and may also provide a fast failover (to the SeNB) in the event the MeNB experiences a radio link failure (RLF).

Multi-connectivity (MC) generally refers to a mode of operation wherein a UE is connected (e.g., radio resource control (RRC) connected) to an MeNB and at least one SeNB, as illustrated in FIG. 1. FIG. 1 shows a specific example of MC, with two different eNBs, that may be referred to as dual connectivity (DC). In MC, a group of serving cells associated with the MeNB, including a primary cell (PCell) and optionally one or more secondary cells (SCells), may be referred to as a master cell group (MCG). Similarly, a group of serving cells associated with the SeNB may be referred to as a secondary cell group (SCG).

Certain aspects of the present disclosure present MC procedures which include procedures to change (add to an SCG, remove from an SCG, or modify the configuration of) one or more cells of an SeNB, while maintaining a current MeNB. As will be described in greater detail below, MC procedures may include various options for offloading data communications using MC, for example, at the packet level, bearer level, or access packet network (APN) level.

MC procedures may also include handover procedures to change the MeNB, e.g., by transferring the functionality of the MeNB for a UE's MC configuration to another eNB, as well as additional aggregation procedures. The aggregation procedures may include procedures to change (add, remove, or modify) a set of one or more secondary component carriers (SCC) of the MeNB and/or an SeNB. In some cases, aggregation may imply a primary component carrier (PCC) controlling one or more secondary component carrier (SCCs) with a common media access control (MAC) layer.

The present disclosure provides various options for aggregation and U-plane splitting, such as aggregation within a same node, (e.g., carrier aggregation) and U-plane splitting across nodes via the radio access network (RAN). For example, for multi-connectivity, a data flow may be split on a per-packet basis or split on a per-bearer basis (e.g., split over the X2 interface instead of the S1 interface).

In some cases, the U-plane may also be split across nodes via the CN, for example, via a bearer-split using multi-connectivity. That is, a CN sending data via multiple bearers e.g., Bearer A and Bearer B in FIG. 1, to a UE may use multi-connectivity to assign one bearer to an MeNB and a second bearer to an SeNB, and send data packets to the MeNB and SeNB based on which bearer each packet is traversing.

Another option for aggregation and U-plane splitting is non-seamless offload, which may include offloading to another operator (if allowed), for example, if session continuity is not necessary. This may be considered equivalent to per-packet splitting if multi-path transmission control protocol (MP-TCP) is available, otherwise the split may occur at the Internet protocol (IP) flow level. Another option is multi-casting (e.g., bi-casting) traffic wherein, for example, each packet is served by both the MeNB and SeNB for greater reliability.

Aspects of the present disclosure describe several possible considerations for making aggregation and U-plane split decisions. In some cases, aggregation in a node may utilize a common MAC layer. The aggregated PCC and SCC(s) may have compatible control channels and timing requirements, but may not require a separate UL channel (e.g., for acknowledging transmissions) for the SCC(s).

In some cases, per-packet U-plane splitting performance may be optimized to support multiple access links across RATs with different latencies and link error rates. Similarly, per-packet U-plane splitting performance may be optimized across licensed, shared, and/or unlicensed bands, and for cells sharing the same carrier and/or for cells on separate carriers.

Example Protocol Stack Configurations for Aggregation and User Plane Splitting

Figure 2A:
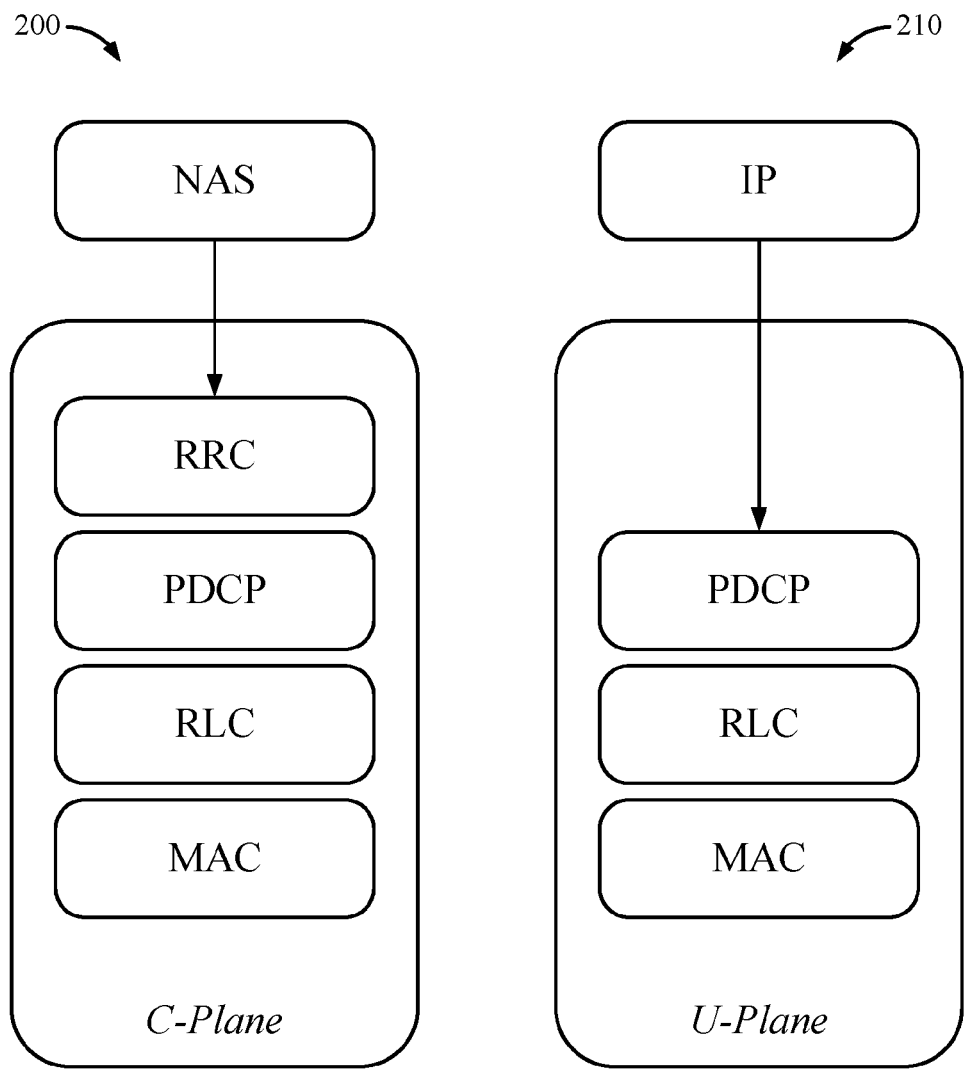
FIGS. 2A and 2B illustrate example protocol layers for control plane and user plane routing, in accordance with certain aspects of the present disclosure.

Different options for U-plane splitting may be described with reference to wireless communication protocol stacks, such as the Long Term Evolution (LTE) C-plane stack 200 and U-plane stack 210 shown in FIG. 2A. In the C-plane, a non-access stratum (NAS) message is received by the radio resource control (RRC) layer and is passed down to the packet data convergence protocol (PDCP) layer, radio link control (RLC) layer and media access control (MAC) layer. In the U-plane, an IP packet is received by the PDCP layer and passed down to the RLC layer and MAC layer.

As mentioned above, different levels of U-plane splitting are possible, with different corresponding considerations when making routing decisions. For example, for a per-bearer or per IP flow split, a decision of where to serve each IP packet may be based on a Traffic Flow Template (TFT) associated with the bearer or IP flow. In this case, a common PDCP layer or RLC layer may not be required between different serving nodes as there is no reordering issue between serving nodes, since all the IP packets for a flow are routed through the same serving node. That is, because the packets are routed based on which bearer or flow the packets belong to, all of the packets for any given flow arrive at the UE from one serving node, and the receiving UE can determine the correct order of the packets from indicators supplied by the node.

When packets of a flow arrive from multiple serving nodes, the indicators (e.g., sequence numbers) used by the nodes may conflict, and the receiving UE cannot determine the proper order of the packets. For example, in the case of a per-bearer or per-IP-flow split, the split may occur at a serving gateway (SGW) via an S1 interface (e.g., for MC) or at a packet data network gateway (PGW) or home agent (HA) (e.g., for WLAN interworking), resulting in packets for the bearer or IP flow being delivered to multiple serving nodes which may then assign their own indicators to the packets without coordination. For the UE to reassemble the packets in the correct order, some coordination or additional information must be provided. As an example, the node at which the split occurs may provide packet identifiers that determine a sequence of packets for the bearer, irrespective of the serving node that delivers a particular packet. A RAN-only solution may also be possible via an interface between serving nodes, e.g., an X2 interface.

For U-plane splitting on a per-packet basis, a common PDCP layer (for MC) across serving nodes may be utilized to reorder the packets in a flow, while RLC reordering may also be possible. In the case of U-plane splitting on a per-packet basis, the per-packet decision of where to serve each PDCP packet may be based on scheduling requirements (e.g., bandwidth available at transmission times) on each eNB. According to certain aspects of the present disclosure, flow control may be defined between the MeNB and SeNB to allow the MeNB and SeNB to make the per-packet determinations of where to serve each PDCP packet.

In certain systems (e.g., current LTE), mobility and aggregation are generally based on the principle that a UE is served by a single serving eNB on the C-plane, meaning that RRC and NAS signaling are only sent to the UE via a single eNB. In some versions of these systems, a UE may also be served by up to 2 serving eNBs on the U-plane, and by multiple (e.g., up to 5 in Release 12 of LTE) cells across the 2 serving eNBs.

Figure 2B:
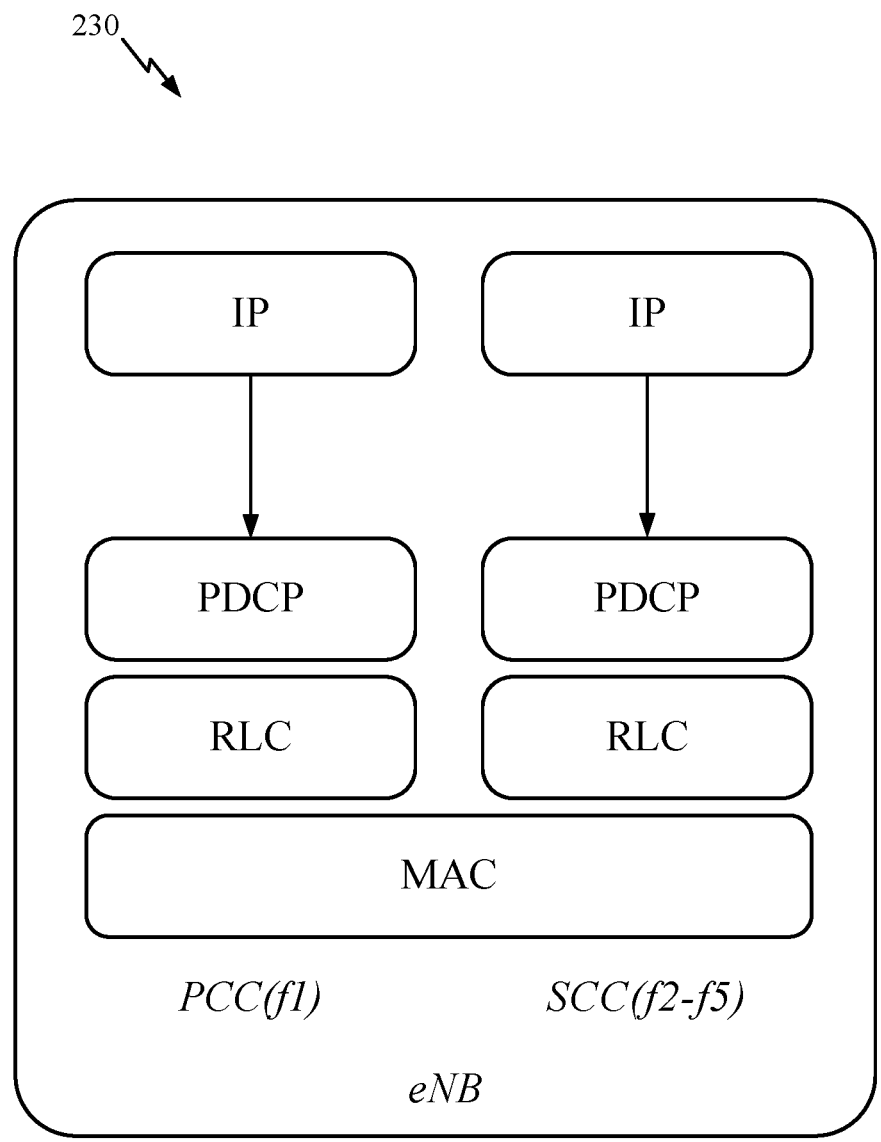

FIG. 2B illustrates an example configuration 230 of carrier aggregation for the U-plane protocol stack for an eNB having a primary component carrier (PCC) f1 and secondary component carriers (SCCs) f2-f5 in current wireless communication systems (e.g., LTE Rel-10). In carrier aggregation (CA), reconfiguration, addition, and removal of secondary cells (SCells) within a single serving eNB may be performed by the RRC function. The primary cell (PCell), belonging to the same eNB, is used for transmission of physical uplink control channels (PUCCH), and NAS information is taken from the PCell. Cross-carrier scheduling, via a carrier indicator field (CIF), allows the physical downlink control channel (PDCCH) of a serving cell (e.g., the PCell) to schedule resources on another serving cell. Unlike SCells, it may not be possible to remove or deactivate a PCell.

A PCell serving a UE may be changed with a handover procedure (i.e. with a security key change and RACH procedure). For handover from one LTE PCell to another LTE PCell, RRC functions can also add, remove, or reconfigure SCells for usage with the target PCell. As a result, the UE may be able to handover (HO) to a target eNB and continue CA without the re-establishing connections to SCells serving the UE. Re-establishment of connections by the UE is triggered when the PCell serving the UE experiences RLF, but not when SCells experience RLF. UEs operating in a CA system generally receive data faster due to the increased available bandwidth in a CA system than in a system without CA.

Figure 3:
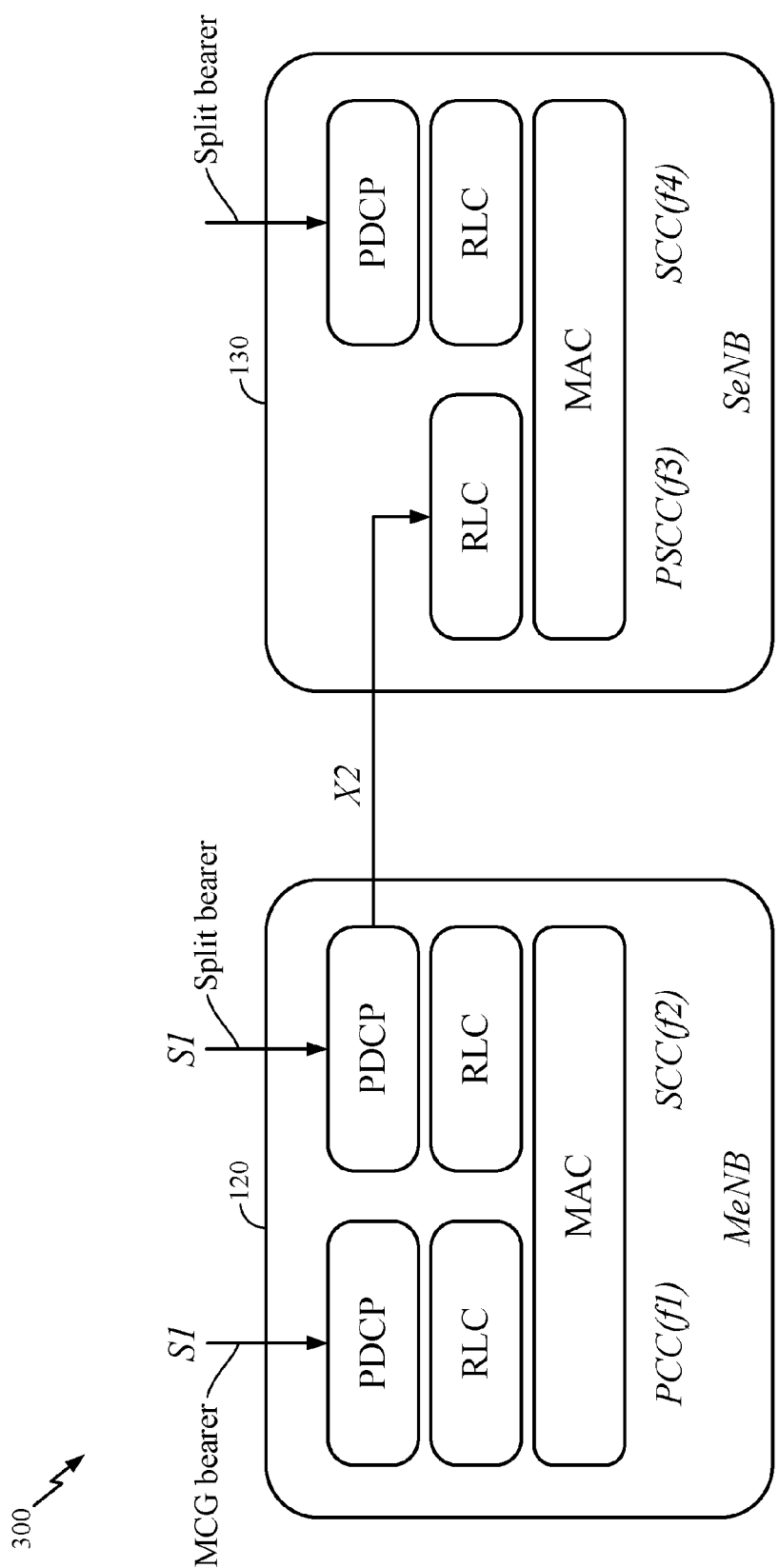
FIG. 3 illustrates an example multi-connectivity protocol stack, in accordance with aspects of the present disclosure.

FIG. 3 illustrates an example configuration 300 of a dual connectivity protocol stack linking (via an X2 connection) an MeNB and an SeNB. The protocol stack for a particular bearer generally depends on how that bearer is setup. For example, various alternative types of bearer exist: MCG bearers, split bearers, and SCG bearers. For MCG bearers (e.g., the left bearer in FIG. 3), the MeNB is U-plane connected to the S-GW via an S1-U interface and the SeNB is not involved in the transport of user plane data for this bearer. For split bearers (e.g., the middle bearer in FIG. 3), the MeNB is U-plane connected to the S-GW via an S1-U interface and, in addition, the MeNB and the SeNB are interconnected via an X2-U interface, allowing both the MeNB and the SeNB to deliver U-plane data to the UE. For SCG bearers (e.g., the right bearer in FIG. 3), the SeNB is directly connected with the S-GW via an S1-U interface.

Signaling radio bearers (SRB) are typically of the MCG bearer type and, therefore, use radio resources provided by the MeNB. At least one cell in SCG typically has a configured UL RRC connection, and one of them is configured with PUCCH resources, which may be used for control procedures (e.g., data scheduling) that do not require the existence of an SRB. As noted above, re-establishment may be triggered when the PCell experiences RLF, but not when an SCell experiences RLF. The MeNB maintains the radio resource management (RRM) measurement configuration of the UE and may decide to request an SeNB to provide additional resources (serving cells) for a UE (e.g., based on received measurement reports or traffic conditions or bearer types). In this case, the MeNB and the SeNB may exchange information about UE configuration by means of RRC containers (inter-node messages) carried in X2 messages. In DC, two cell radio network temporary identifiers (C-RNTI) are typically independently allocated to a UE, one for use in communicating with the MCG, and one for use in communicating with the SCG.

Example User Plane Offload Options

As used herein, the term offload generally refers to the breaking out (i.e., offloading) of data at an earlier point in the path. For example, if data is routed from one path (e.g., through an MeNB and an SeNB) to a shorter path (e.g, through an SeNB only). For example, a UE may be said to be operating with minimal offload for a flow, if all data is routed through a GW in the CN via an MeNB. The UE may be said to be operating with local offload for a flow, if all data is routed through a LGW in the MeNB while the UE may be said to be operating with maximum offload for the flow if all the data is routed through a LGW in the SeNB and does not traverse the MeNB.

As used herein, the term User plane (U-plane) splitting generally refers to how the traffic is delivered from the GW to the UE. As will be described in greater detail below, decisions regarding where to offload traffic and how to configure U-plane splitting may be based on the data service requirements and other considerations (e.g., available resources and radio frequency (RF) conditions of potential offload targets).

Figure 4:
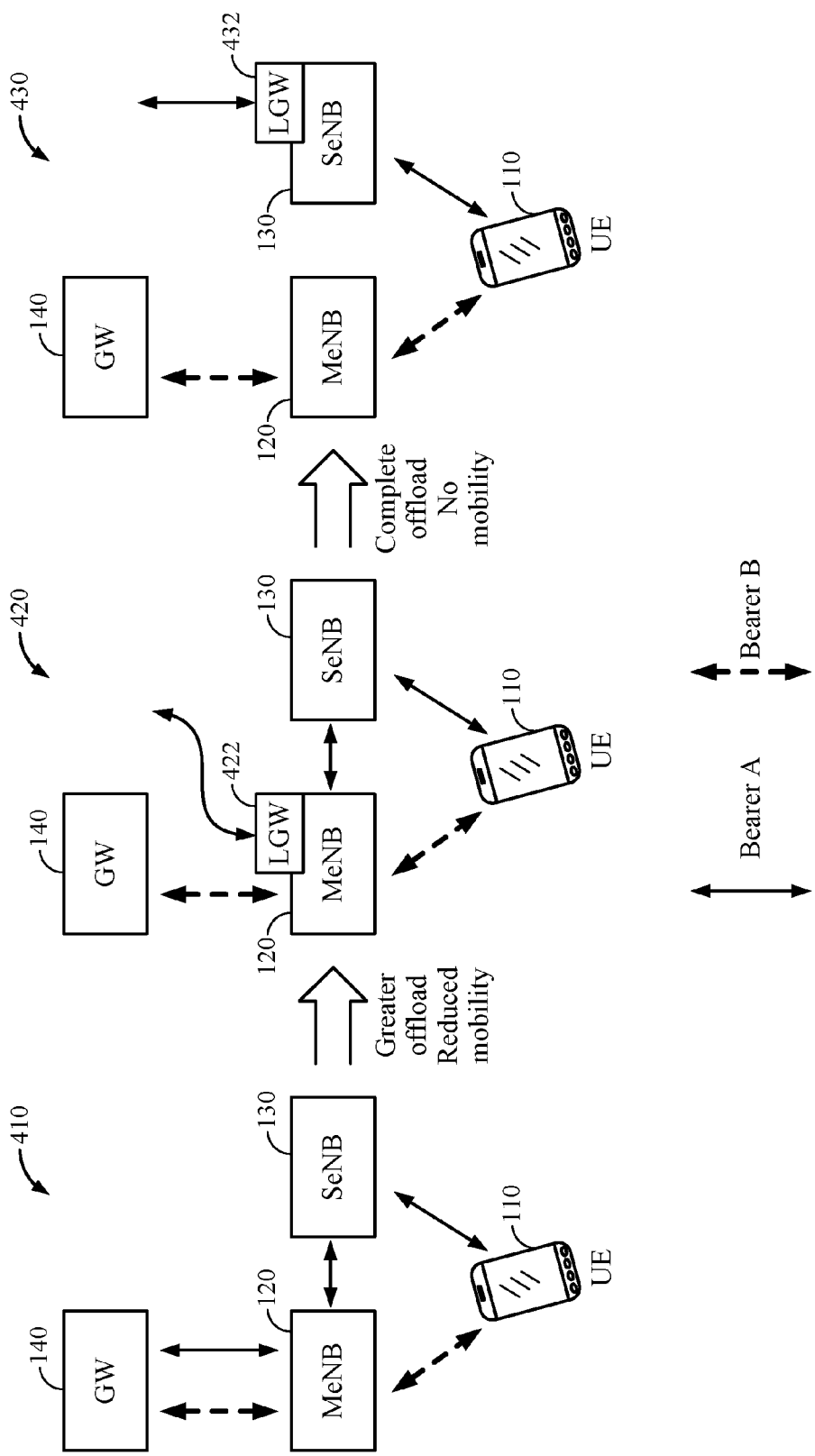
FIG. 4 illustrates example offload configuration, in accordance with aspects of the present disclosure.

FIG. 4 illustrates various U-plane offload options. In a first configuration 410, the GW 140 for U-plane data, such as operator services and voice over LTE (VoLTE), may be in the core network (CN). In the first configuration, the U-plane data may be described as minimally offloaded (from the perspective of the core network), because the common gateway 140 is upstream of the MeNB and SeNB.

In a second configuration 420, the GW may be at the MeNB (shown as local or logical gateway LGW) for traffic requiring "local" session continuity within the service area of the MeNB, such as selected internet IP traffic offload (SIPTO) at the RAN. In the second configuration, the "local" session traffic may be described as being in a greater offload (e.g., more offloaded) than the traffic in the first configuration because the local gateway 422 is located at the MeNB, meaning that data handling (e.g., routing) for such traffic can take place at the MeNB rather than at nodes in the core network.

In a third configuration 430, the LGW 432 is at the SeNB for non-seamless traffic (e.g., SIPTO at a local network). In the third configuration, the non-seamless traffic may be described as completely (or maximally) offloaded, as the gateway is located at the SeNB, and thus none of the traffic traverses the MeNB or the network operator gateway. Mobility for the services provided to the UE decreases as the offload increases, because mobility (e.g., handovers) are managed by the MeNB, but the offloaded traffic is traversing and even being managed by the SeNB.

Decisions on where and how to offload data may have significant impacts on performance and implementation complexity. For example, data offload in the RAN may reduce overall U-plane traffic at the CN and enable efficient access to local services. However, this same offload may impact user experience for highly mobile UEs due to the need to relocate or modify the gateway functionality if the UE changes cells, and may also increase backhaul connectivity requirements for data forwarding between cells for local session continuity.

Figure 5:
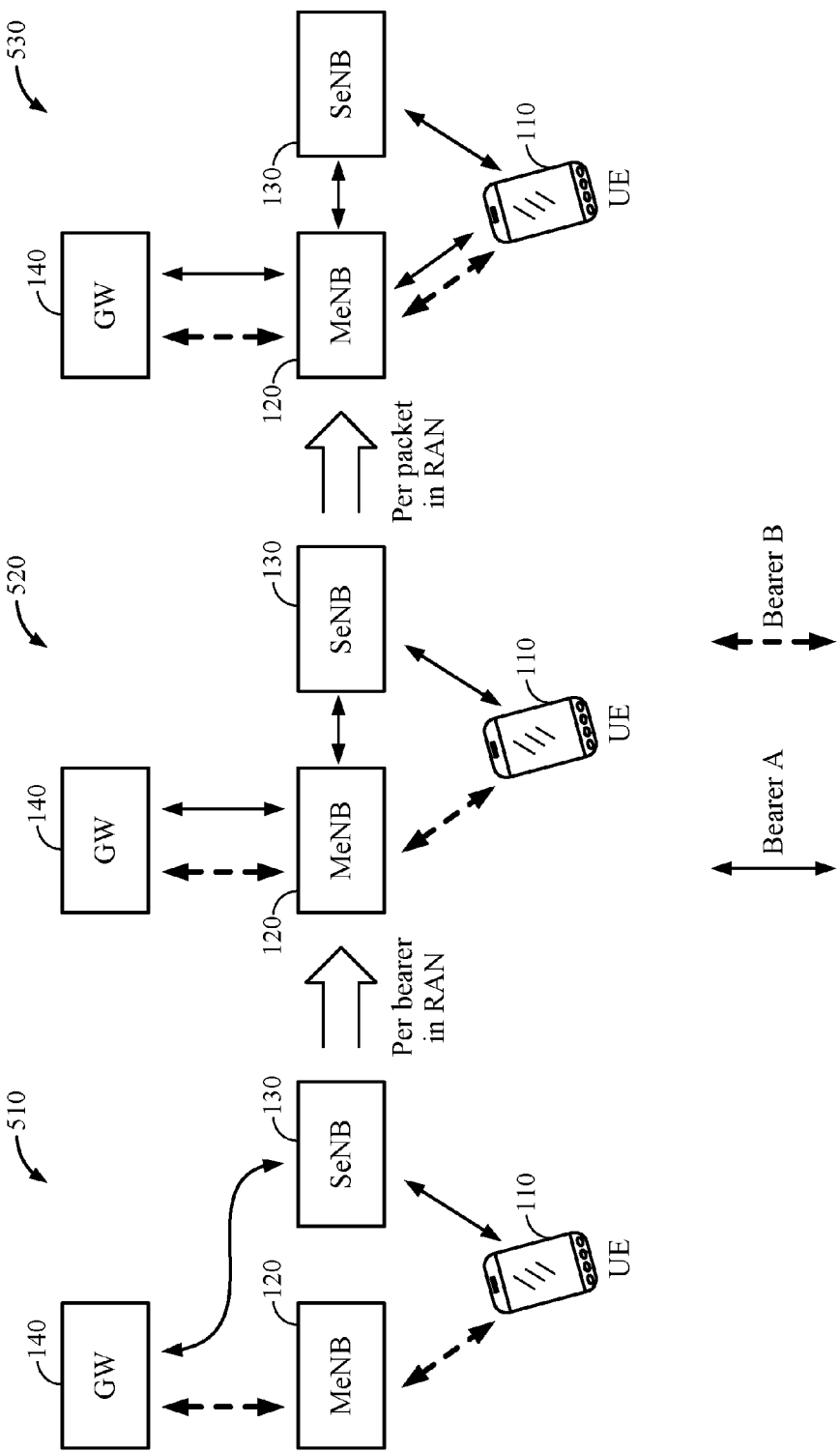
FIG. 5 illustrates example user plane (U-plane) splitting configurations, in accordance with aspects of the present disclosure.

FIG. 5 illustrates three example U-plane splitting options. U-plane splitting configurations generally define how and where bearers are served by the network and UE for seamless connectivity. Decisions regarding whether U-plane data is split on a per-packet basis (packet splitting) or a per-bearer basis (bearer splitting) may be based on coupling between the MeNB and SeNB. In addition, the decisions may be a function of UE capability and backhaul availability As illustrated, in a first configuration 510, U-plane data may be routed to or from the core network GW 140 via the SeNB 130. This is an example of bearer splitting in the core network.

A second configuration 520 shows per-bearer U-plane splitting (or simply bearer splitting) in the RAN. That is, the packets are routed based on which bearer each packet is for by the core network in configuration 510 and by the RAN in configuration 520.

A third configuration 530 shows per-packet U-plane splitting (or simply packet splitting) in the RAN. As illustrated, in this configuration, some packets for a bearer are served by the MeNB while other packets are served by the SeNB.

For bearer splitting, there may be no need to route, process and buffer bearer traffic served by the SeNB at the MeNB. As a result, there is no need to route all traffic to the MeNB, which may allow for less stringent requirements on the backhaul link between the MeNB and the SeNB (e.g., less bandwidth demands and higher latency tolerated). In addition, bearer splitting may provide support of SIPTO and content caching at the SeNB, as well as independent protocol stacks on each link as there is no requirement for coordinated flow control between the two links.

In some cases, packet splitting may have advantages over bearer splitting. For example, for bearer splitting the offloading may need to be performed by a mobility management entity (MME) configuring the tunnels (e.g., IPSec tunnels or other protocol tunnels) at the SGW and, as a result, dynamic changes to the configuration of bearers may be limited and may require SeNB mobility to be visible to the CN. That is, if a UE moves out of the service area (e.g., a cell) of an SeNB, the CN must be informed so that the CN can reconfigure the bearers for the UE. For bearers handled by the SeNB, handover-like interruption may occur with SeNB changes, with data forwarding between SeNBs. Further, utilization of radio resources across an MeNB and an SeNB for the same bearer may not be possible in many cases.

Packet splitting may enable CA-like gains across cells and fine granularity load balancing (as routing decisions are made per-packet rather than per-bearer). Packet splitting may also enable more dynamic bearer switching based on cell loading and may also reduce CN signaling as SeNB mobility may be partly or entirely hidden from the CN. That is, the CN may not be informed of a UE moving out of a service area of a particular SeNB, as the CN forwards the packets to the RAN, and the RAN determines which SeNB (or the MeNB) delivers the packet to the UE. Further, as routing decisions are made per-packet, no data forwarding between SeNBs may be required upon a change of the SeNB (e.g., when changing SeNBs, packets may simply not be routed to an SeNB being de-activated), thus relaxing requirements for SeNB mobility. In addition, utilization of radio resources across MeNB and SeNB for the same bearer may be possible.

In some cases, bearer splitting may have advantages over packet splitting. For example, packet splitting may require routing, processing and buffering all traffic in the MeNB and may also increase backhaul connectivity requirements, relative to bearer splitting, for data forwarding between cells, and packet splitting does not readily support SIPTO or content caching at the SeNB. In addition, packet splitting may require coordinated flow control and may result in more complex protocol stacks (relative to bearer splitting) to account for different links and over the air (OTA) and backhaul latencies.

Example Control Plane Options

Various RRC functions may be relevant for the SeNB operation used in MC routing. For example, common radio resource configurations of an SeNB, dedicated radio resource configurations, and measurement and mobility control for the SeNB, may be relevant to MC routing.

Figure 6:
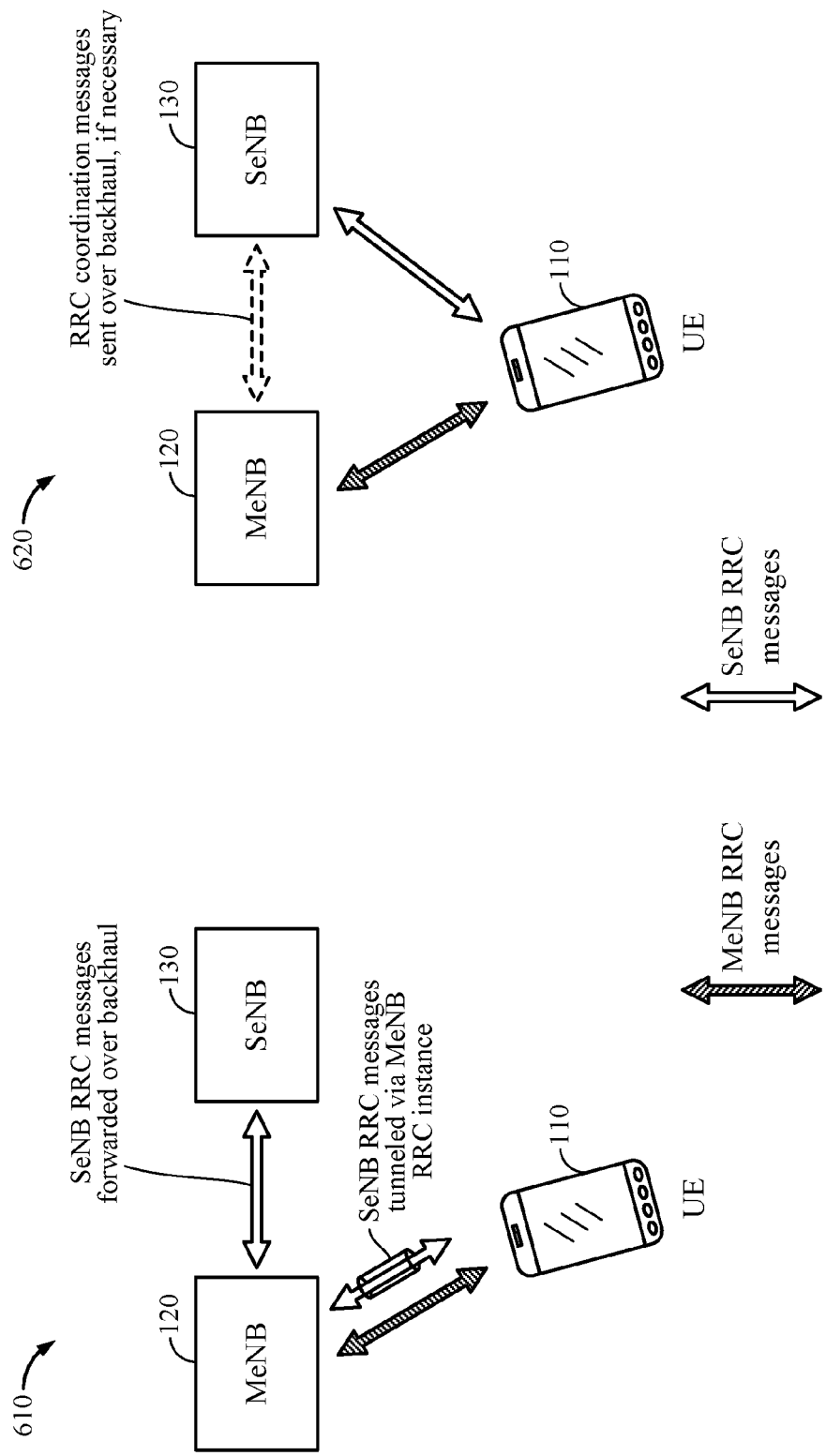
FIG. 6 illustrates example control plane (C-plane) logical architecture options, in accordance with aspects of the present disclosure.

FIG. 6 illustrates example control plane logical architecture options for RRC. In some cases, the RRC packets for the MeNB 120 may be sent to the MeNB via the SeNB 130 and forwarded over the backhaul (configuration 620) and/or vice versa (configuration 610). In this case, the RRC messaging (or other RAT equivalent signaling) may need to support an address scheme over the air (OTA) to identify the target (whether MeNB or SeNB) for the packet.

As illustrated by configuration 610, the RRC logical architecture may include a single RRC instance in an MeNB, wherein any RRC messages delivered via an SeNB are tunneled via the MeNB RRC instance. As illustrated by configuration 620, the RRC logical architecture may also include separate RRC (or equivalent) instances in the MeNB and the SeNB, for example, with the separate independent instances managing the air link configuration. In this case, coordination over X2 may be needed for UE configuration, for example, the MeNB and SeNB may coordinate to assign common or mutually compatible discontinuous reception (DRX) parameters to the UE.

In some cases, the RRC functionality allowed in the SeNB may only be a subset of the full RRC functionality (e.g., if only the MeNB manages mobility of the UE in connecting to the SeNB and U-plane splitting configuration). In this case, the RRC instance in the MeNB may be considered a primary RRC and the RRC instance in the SeNB may be considered a secondary RRC. In some cases, the SeNB may be associated with a different RAT as compared to the MeNB, which may be similar to having separate systems as there may be no requirement for the MeNB to manage the configuration of the SeNB air link to the UE.

Figure 7:
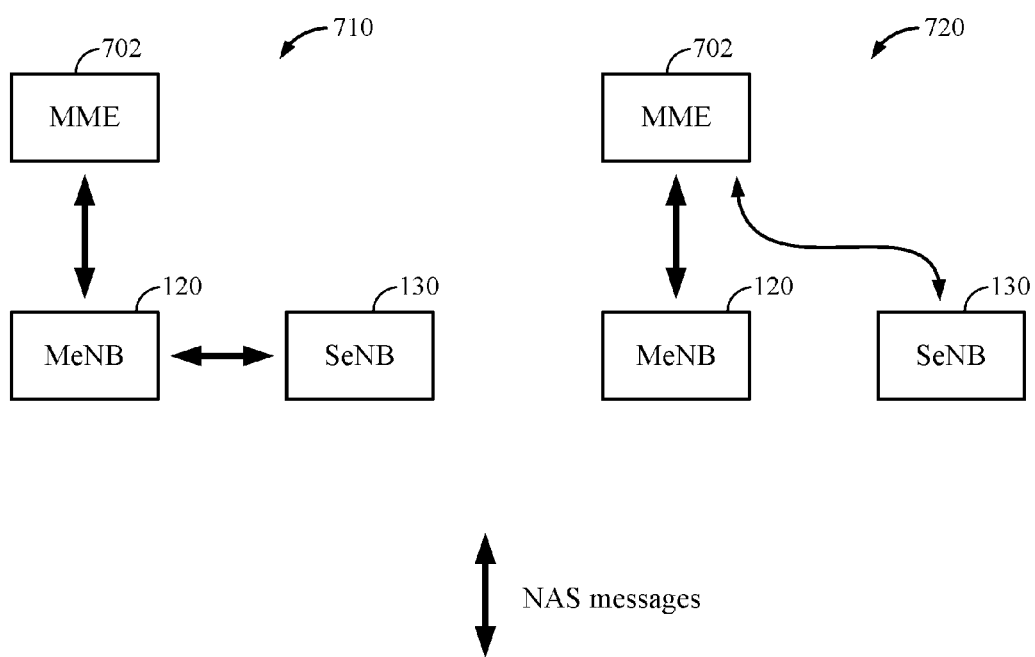
FIG. 7 illustrates example control place (C-plane) Non-Access Stratum (NAS) logical architecture options, in accordance with aspects of the present disclosure.

FIG. 7 illustrates C-plane NAS logical architecture options. The NAS logical architecture options include a single NAS instance in an MME 702, served by lower layer transport through a single MeNB 120 as illustrated by configuration 710. The protocol stack in the MeNB provides transport for NAS messages exchanged by the UE with the MME. In this logical architecture, NAS messages may or may not be sent through the SeNB 130, depending on the RRC logical architecture used with the NAS architecture. NAS messages to be sent through the SeNB are forwarded to the SeNB from the MeNB (for delivery from the MME to the UE), or forwarded to the MeNB from the SeNB (in case of delivery from the UE to the MME).

A second C-plane NAS logical architecture option is to include an independent instance in each of the MeNB and the SeNB of a protocol layer capable of delivering messages to a NAS instance in the MME (e.g., an RRC layer), as illustrated by configuration 720. In the second NAS architecture, the MME 702 exchanges NAS messages via both the MeNB 120 and the SeNB 130. In such an architecture the MME may operate a single NAS protocol instance with the ability to coordinate separate communications with the SeNB and the MeNB. The protocol layer implemented in the SeNB for communication with the NAS layer in the MME may comprise only a subset of the underlying protocol; e.g., an RRC layer in the SeNB may not support all functions of a complete RRC instance, as described further below.

A particular example implementation of a C-plane NAS and RRC logical architecture may have separate RRC (or equivalent) instances in an MeNB and an SeNB with a single NAS in the MeNB. The separate RRC instances may require some coordination over X2 for dedicated and common resources in order to serve the UE, although this coordination may be invisible to the UE. As noted above, the RRC instance in the SeNB may only be a subset of a full RRC (e.g., the RRC of the MeNB may act as a primary RRC which manages mobility of the UE to the SeNB and U-plane splitting configuration, and the RRC of the SeNB may act as a secondary RRC with limited functionality, such as having only the ability to provide transport for NAS messages without supporting the mobility and resource management functions that would normally be present in a fully implemented RRC protocol instance). NAS messages from the single NAS instance in the MeNB may be sent to either the MeNB or the SeNB. A new procedure may be used to reconfigure the SeNB to function as an MeNB for a particular UE, for example, as a "failover" mechanism in the case of RLF on the MeNB.

Example Control Plane Mobility

Figure 8:
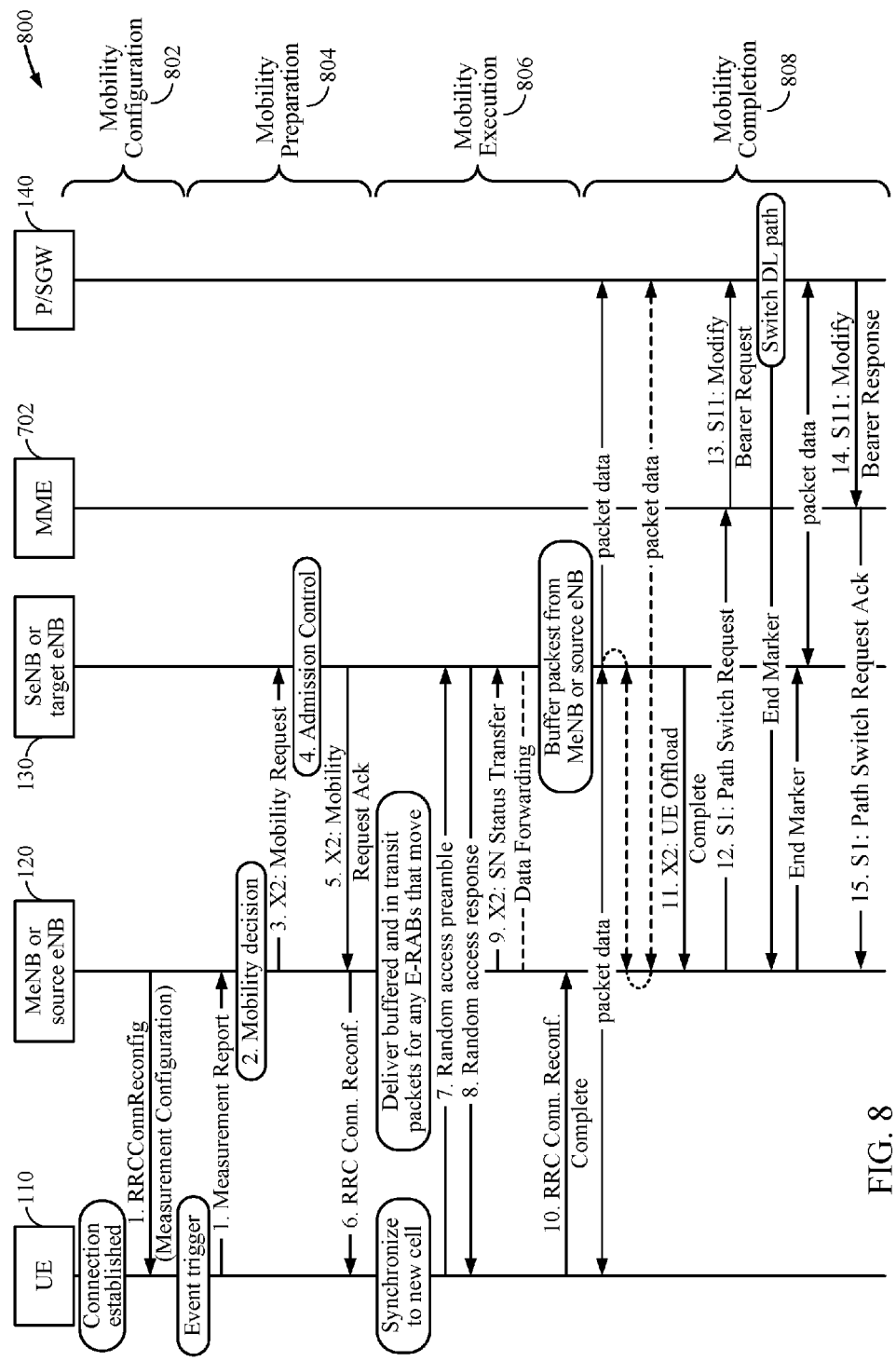
FIG. 8 illustrates an example call flow diagram of a mobile device, a master base station, and a secondary base station, in accordance with aspects of the present disclosure.

FIG. 8 illustrates an example call flow diagram 800 for a C-plane mobility procedure, where a DC data path is shown as a dashed line for PDCP aggregation. As illustrated, the C-plane mobility procedure may occur in four general phases. The four phases apply for mobility during both handover and multi connectivity. The four phases may include a UE mobility configuration phase 802, a RAN mobility preparation phase 804, a mobility execution phase 806, and a mobility completion phase 808.

The UE mobility configuration phase 802 begins with, for example, the UE establishing a connection and receiving, from the MeNB, a measurement configuration. UE mobility configuration allows the RAN to configure the UE to set the RF triggers for mobility. This includes the RF conditions on the serving cell, neighbor cells (both intra and inter RAT), and relative conditions between the serving and neighbor cells. The UE mobility configuration includes service and context aware events. For example, based on a specific traffic type, the UE may perform measurements on frequencies or other resources to trigger mobility events to RATs or channel resources specific to a certain type of traffic (e.g., a type defined by latency or other QoS aspects, low power requirements for the UE, or a content type, e.g., Multimedia Broadcast Multicast Service (MBMS)). In certain aspects, the network may provide configuration, including context and service configuration, for a UE to determine when to perform HO measurements (UE-centric measurement triggering). In other aspects, the UE provides context and service state to the network, and the network triggers measurement events based on the state (network-centric measurement triggering). Both UE- and network-centric measurement triggering may be in use in a single system, e.g., for different event types.

During the RAN mobility preparation phase 804, the UE context is provided to the SeNB or a target eNB. For example, the UE sends a measurement report to the MeNB, which makes a mobility decision based on the measurement report. The MeNB then, for example, sends a mobility request via the X2 connection to the target eNB (the prospective SeNB) to perform admission control. For backward HO, the UE context is sent to the target eNB before the HO or DC event, for example, triggered based on the UE measurement report in response to the mobility configuration. For forward HO, the context is sent after the HO event, i.e., sending the context is triggered as a pull from the target eNB in response to the UE establishing a connection at the target eNB and identifying the source eNB. The backward-HO approach would typically be expected for multi-connectivity mobility events, but the forward-HO approach is also possible, Sending the context after the HO or DC event (the forward-HO model) may provide a potential for more efficient preparation of multiple target eNBs, when compared to sending the context before the HO event. Moreover, sending the context after the HO or DC event may allow for differentiation between handovers within a cloud or cluster and handovers to a BS outside the cloud or cluster. For example, for intra cloud handover, coordinated multipoint (CoMP) concepts may be extended to provide a single logical context across the cloud that does not change when the point of attachment changes, and actual HO (e.g., transferring the control-plane function for the UE from one eNB to another) may only be needed for inter cloud UE mobility.

During the mobility execution phase 806, the UE may establish a connection at the SeNB or target eNB. The newly established connection allows UL and DL data to be communicated via the SeNB or target eNB. For example, the SeNB sends a mobility request acknowledgement via the X2 connection to the MeNB. The MeNB then sends an RRC connection reconfiguration message to the UE. The UE then synchronizes to the new cell, sends a random access preamble to the SeNB, and receives a random access response from the SeNB. The MeNB then sends the sequence number (SN) status transfer message to the SeNB and begins data forwarding. This approach may provide the potential to perform an inter-cluster HO while maintaining IP connections via selected IP traffic offload (SIPTO) and local IP access (LIPA). In addition, this approach may allow optimized procedures to assign a new IP address on HO, as well as enabling more make before break (as compared to current HO techniques) for mission critical applications, due to multi connectivity. MPTCP can be used (e.g., end-to-end) if required, or applications can be multi-homed or designed to handle IP address changes.

During the mobility completion phase 808, the network moves any tunnels associated with the SeNB or target eNB and the SGW to point directly to the SeNB or target eNB and in the case of HO, releases resources on the source eNB.

Example Admission Control and Load Balancing

As noted above, as a part of managing UE connectivity to the RAN, an MeNB may make decisions, for the UE, regarding aggregation and U-plane splitting options. When a set of services change on an SeNB or a UE context changes, an MeNB may want perform load balancing or admission control for the new services based on the current configuration of the aggregation and U-plane split for the UE.

Contexts may include, for example, Mobility (for example, car, train, bike, plane, pedestrian, or stationary), location (including outdoors or indoors, at work or home, in a meeting, in a conference), accessibility and UE state (for example, on the user's body, separate from the user such as for charging, screen on/off, in holster pocket, active use). Services may include, for example, applications (for example, Facebook, YouTube) or service types (for example, voice, streaming, or downloads).

In some cases, the MeNB may be aware that the services are activated, for example, if the U-plane for the data is via the MeNB. For example, the MeNB may be aware that the services are activated in the following cases: aggregation within a node (for example, carrier aggregation), U-plane split across nodes via the RAN (for example, multi-connectivity using packet split or bearer split over X2 connection instead of S1 connection), or when multi-casting traffic (for example, each packet is served by both the MeNB and SeNB for greater reliability).

In certain cases, the MeNB may be aware of the service, for example, if the UE activates a new bearer for the service the MME may inform the MeNB of the service requirements as a part of the configuration of the bearer at the MeNB. The MeNB may see the bearer activation and may be, in certain cases, responsible for the configuration and handover of the bearer to the SeNB. On the other hand, when services are activated within an existing bearer or U-plane, then no C-plane signaling may be present to indicate that the service is activated. In certain cases, where traffic may only be visible at the SeNB, techniques such as deep packet inspection (DPI) may not be possible since the traffic does not go through the MeNB.

In other cases, the MeNB may not be aware of the UE services. For example, the MeNB may not be aware of the UE services in the case of U-plane split across nodes via the CN (e.g., multi connectivity-bearer split) or in the case of non-seamless offload (NSO). Cases of NSO may include offload to another operator or access network if, for example, the offload is allowed by the other operator and no session continuity is required for the service.

Aspects of the present disclosure provide a framework to enable the MeNB to be aware of the active services and context for the UE in order to determine the load balancing and admission control for these services.

Aspects of the present disclosure provide various options for determining that a service (e.g., a new service) is active at the MeNB. Some of these options apply to cases in which an MeNB determines that a new service is active (or an existing service is modified) via detection at the gateway (PGW or SGW), for example, based on DPI. In this case, the PGW or SGW may label packets directly or indirectly as corresponding to a service in the general packet radio service (GPRS) tunneling protocol (GTP) tunnel sent to the MeNB or SeNB. For example, the bearer ID may be associated with a quality of service class indicator (QCI) and packets arriving on the bearer may indicate a new service is active.

In certain cases when the new service is a bearer and is associated with a specific service, the bearer may be established when the service is activated. Thus, in this case, the MeNB may see the S1 messages to establish the bearer and may also move the bearer to the SeNB. Alternatively, the GTP tunnel may include a service label information element (IE) which indicates the service to the tunnel end-point. In the case of the GTP tunnel terminating at the MeNB, the MeNB can use the presence of the packets to determine a service on the UE. In the case of the GTP tunnel terminating at the SeNB, the SeNB can inform the MeNB over the backhaul of the service on the UE.

As an alternative or in addition, the PGW or SGW may inform the MME (e.g., via CN signaling) that packets for a service are detected. For example, the PGW may initiate a dedicated bearer activation procedure for the detected service. In this case, the MME may inform the MeNB directly of the service by sending a context update to the MeNB about the set of services on the UE. The MME may also inform the MeNB indirectly, for example, if the MME establishes a new dedicated bearer for the UE at the MeNB for example, as initiated by the PGW or SGW signaling.

Other options for determining that a service is active at the MeNB apply to cases in which services (or context changes) are initiated at the UE. In this case, the UE may inform the MeNB or SeNB of the set of services either explicitly or implicitly. For the implicit case, the UE may use NAS signaling to request a service. For example, the UE may initiate a PDN connection for the service which the MME will determine to allow or deny based on the UE subscription information and the current network loading. For the explicit case, the UE may use RRC or NAS signaling to indicate the active set of services or context of the UE as will be described further below.

Aspects of the present disclosure also provide various options for load balancing the set of services at the MeNB (and/or the SeNB). For example, such options may include load balancing messages sent over the backhaul. In this case, the MeNB and SeNB may exchange reports over the backhaul per UE and per service to determine the correct load balancing at the SeNB and MeNB. The MeNB may use the reports to select among the different options for serving the UE based on services and context of the UE. The options for serving the UE may include, for example, handover, CA, MC, or non seamless offload.

The MeNB may also use the reports to enable an energy efficient network operation based on active services. For example, the MeNB may activate and deactivate RATs in the network based on services being detected and UE measurement reports. If the load on an SeNB falls below a threshold and the MeNB has sufficient capacity, the MeNB may remove all the MC traffic from the SeNB and deactivate the SeNB. Similarly, if the load on the MeNB goes above a threshold, the MeNB may activate certain RATs on certain SeNBs and HO or use U-plane split options to serve some of the traffic on the SeNBs, based on the active services and UE context.

In some cases, UE reports used for load balancing and/or admission control may be sent over the air. The MeNB may configure UE reports to be sent over the air, for example, if no X2 or equivalent backhaul interface exists to the SeNB to exchange load or service related information about the UE. In addition to measurement reports on the radio frequency (RF) related conditions, the UE may inform the MeNB of the quality of service (QoS) related measurement reports related to the services and context for the UE at the SeNB. Thus, based on such reports, the MeNB may determine if the U-plane split needs to be adjusted. The reports may be per service, including event reporting when new services are activated within an existing bearer or APN (for example, services that would not have any C-plane signaling to the MeNB such that the MeNB would not be aware of them unless the UE or SeNB sends an indication).

Certain aspects of the present disclosure provide procedures for the UE to indicate the active set of services or context. The set of services and UE context can be provided to the network at the time the UE establishes a connection to register, for example, with a tracking area update (TAU)/location area update (LAU) and attach. The set of services and UE context can be provided to the network at the time the UE connects for data services (service request). The UE may also provide services and/or UE context in the event of a change (e.g., with some hysteresis to limit unnecessary ping-ponging).

In some cases, the UE may provide a time estimate in the set of services and context that, for example, may indicate when the set of services or context may go into effect or for how long the service or context is expected to last. As noted above, the set of services and context can be provided via NAS signaling to the MME or via RRC signaling to the MeNB or SeNB.

Figure 9:
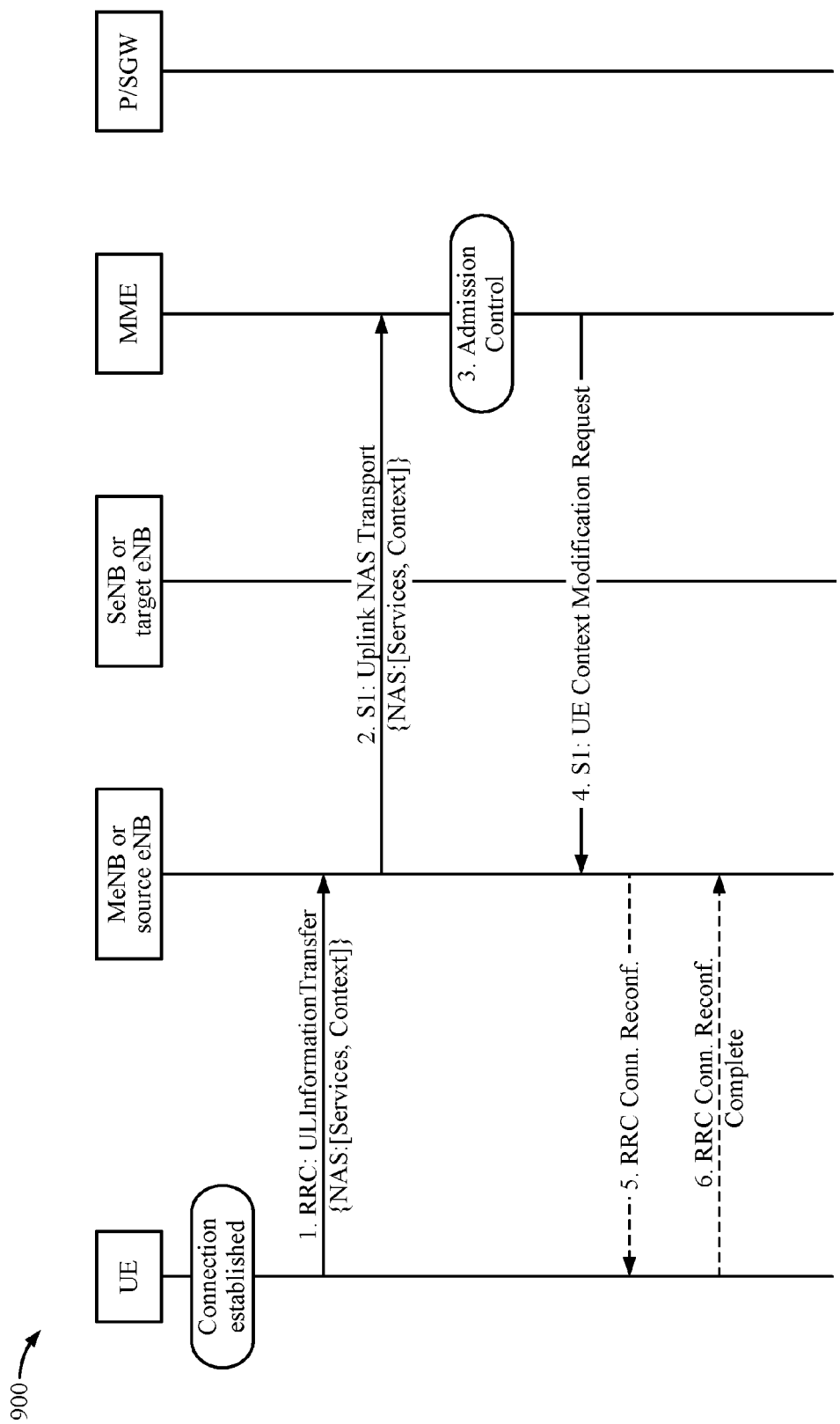
FIG. 9 illustrates an example call flow diagram for providing a set of service and UE context to a mobility management entity (MME), in accordance with certain aspects of the present disclosure.

FIG. 9 shows an example call flow diagram 900 that illustrates example procedures for providing the set of service and UE context to the MME, in accordance with aspects of the present disclosure.

As illustrated, the UE may send an RRC ULInformationTransfer message (1) along with a NAS message including the set of services and UE context towards the MME encapsulated in the RRC message. The eNB forwards the NAS message (2) in a UL NAS Transport container to the MME.

The MME may then optionally performs admission control (3) on the set of services to determine what policy is to be sent to the MeNB or source eNB or how to support the service requirements given the indicated set of services and UE context. The MME then sends the S1-AP UE Context Modification Request (4) to the MeNB or source eNB to indicate the policy and service requirements for the UE based on the context and set of services.

Optionally, the MME may modify existing bearers or initiate new dedicated bearers with the PGW/SGW to support the services and context. The MME may also send the context and set of services to the eNB. As an alternative, the MME may indicate the behavior of the RAN with respect to the services and UE context in the Subscriber Profile ID IE.

In addition, the eNB may send an RRCConnectionReconfiguration message (5) to the UE to modify the bearers or UE configuration in response to the S1-AP UE Context Modification Request (4). The UE may then send an RRCConnectionReconfigurationComplete message (6) in acknowledgement of the RRCConnectionReconfiguration message.

Figure 10:
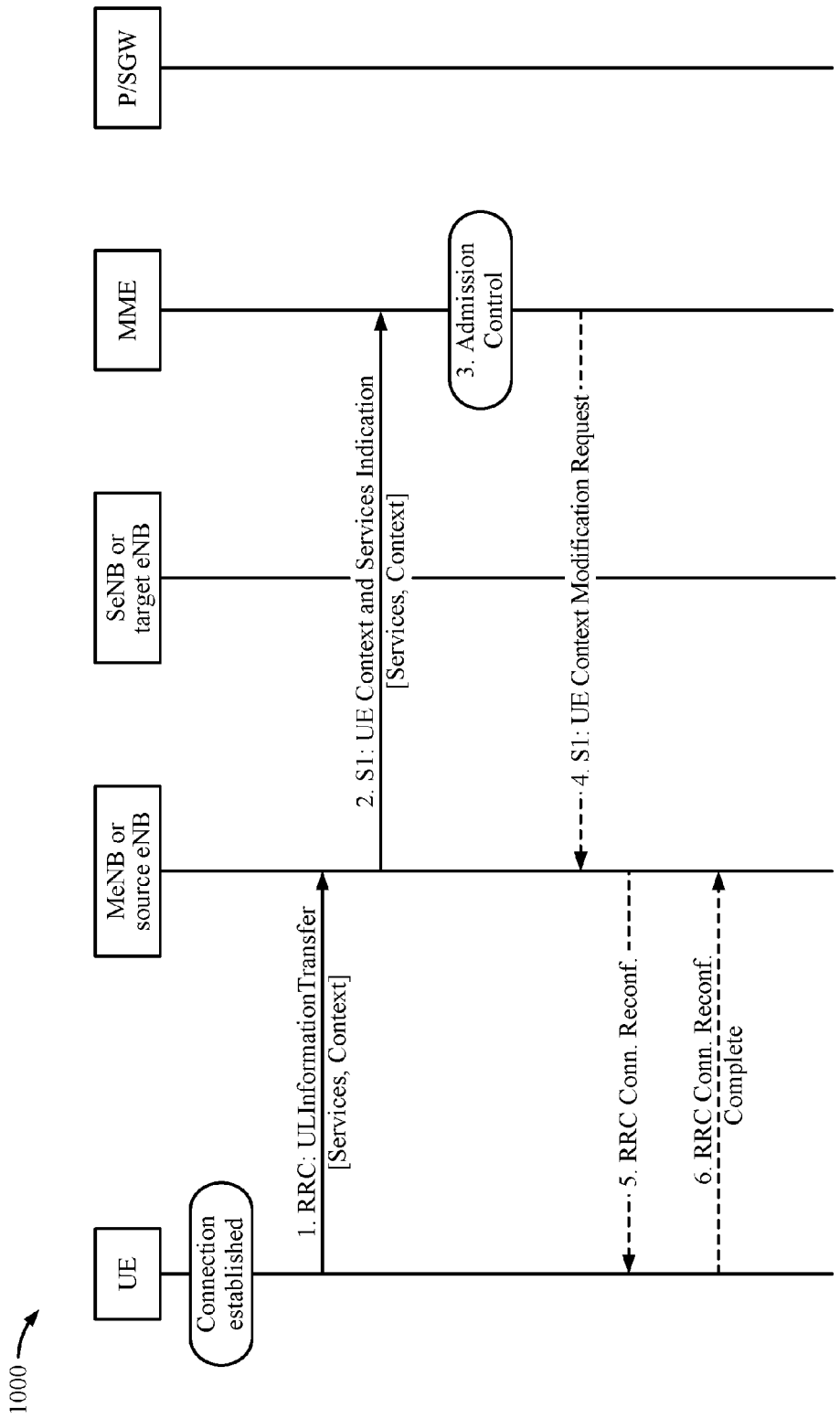
FIG. 10 illustrates an example call flow diagram for providing a set of service and UE context to a RAN, in accordance with certain aspects of the present disclosure.

FIG. 10 shows a call flow diagram 1000 that illustrates example procedures for providing the set of service and UE context to the RAN, in accordance with aspects of the present disclosure.

As illustrated, the UE may send the RRC ULInformationTransfer message (1) including the set of services and UE context to the MeNB or source eNB in the RRC message. Optionally, the eNB forwards the services and context to the MME in a UE Context and Services Indication message (2). The remaining operations 3-6 of FIG. 10 may be performed in the same manner as described above, with reference to FIG. 9.

Figure 11:
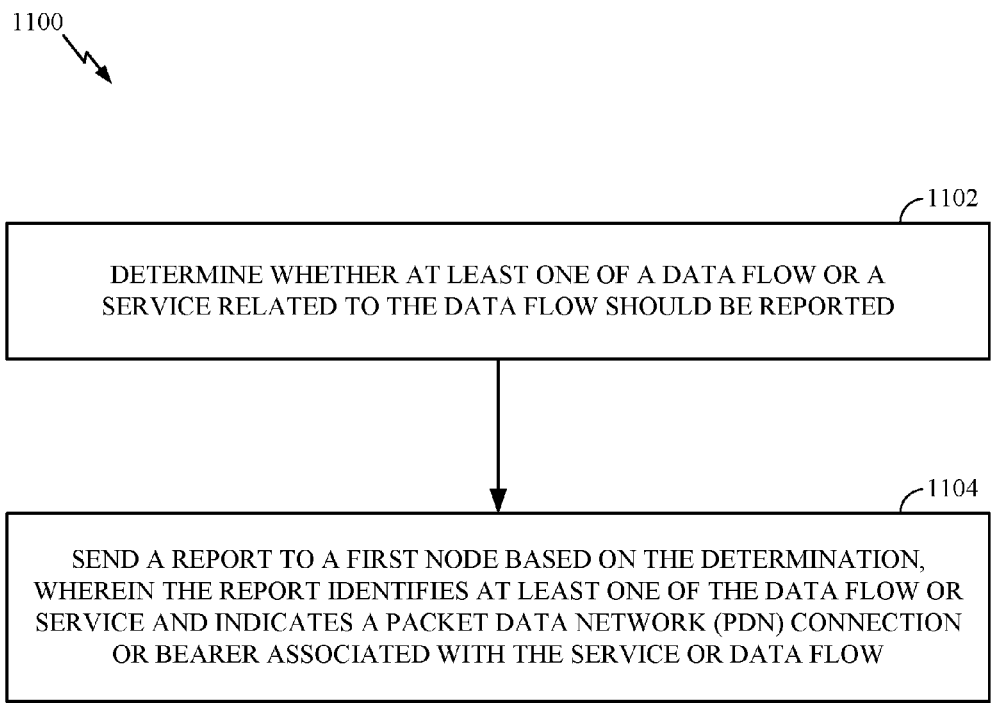
FIG. 11 illustrates example operations for managing at least one data flow between a core network and a mobile device, in accordance with certain aspects of the present disclosure.

FIG. 11 illustrates example operations 1100 for managing at least one data flow between a core network and a mobile device, in accordance with aspects of the present disclosure. The operations 1100 may be performed by a mobile device, such as a UE.

The operations 1100 begin, at 1102, by determining whether at least one of the data flow or a service related to the data flow should be reported. At 1104, the mobile device sends a report to a first node based on the determination, wherein the report identifies at least one of the data flow or service and indicates a packet data network (PDN) connection or bearer associated with the service or data flow.

In some cases, the operations described herein may only be performed when applicable. For example, in certain aspects, the determining and sending are performed in response to some type of triggering event. Examples of such triggering events include identifying that the data flow is activated or identifying that an amount of data is above a threshold.

In some cases, the mobile device (UE) receives a configuration which indicates which data flows to report. In some cases, the determining and sending are performed in response to the configuration. In some cases, the determining is a function of a location of an aggregation point for the data flow (e.g., if the data flow is not received by the first node). In some cases, the report is sent using at least one of radio resource control (RRC) or non-access stratum (NAS) signaling. In some cases, the data flow comprises a new data flow. In some cases, the data flow comprises data for an application. In some cases, the data flow comprises data for a service.

Figure 12:
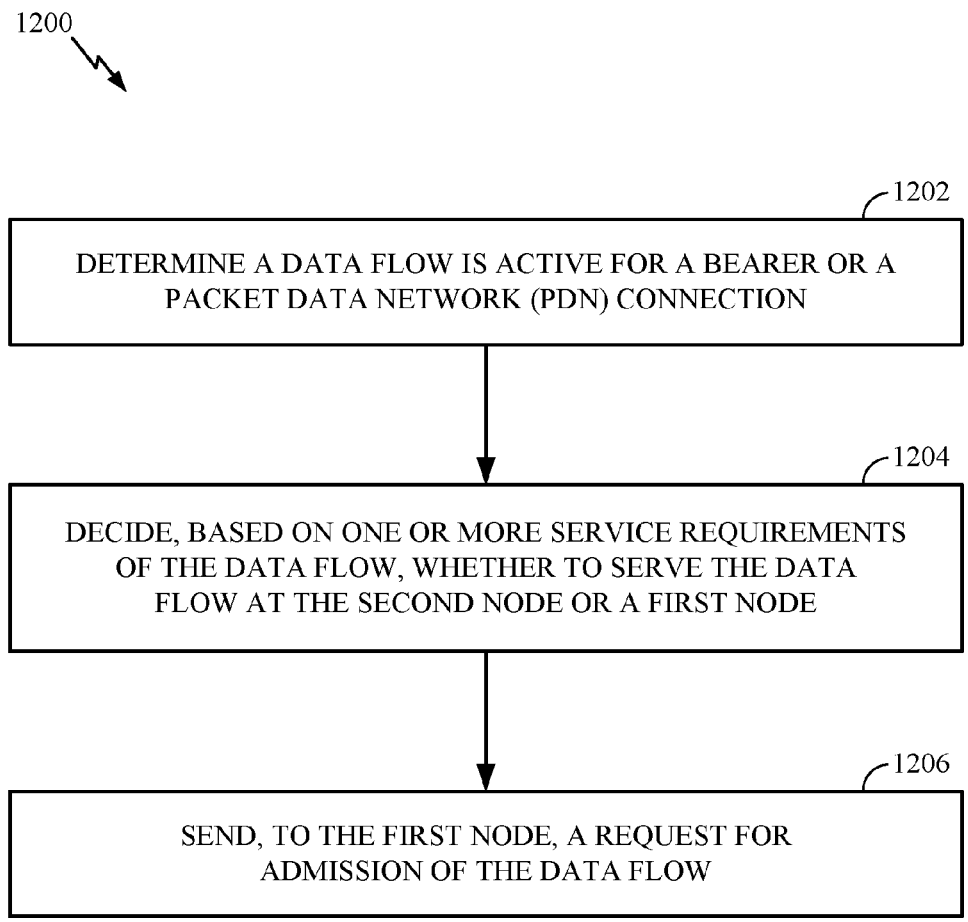
FIG. 12 illustrates example operations for managing at least one data flow, in accordance with certain aspects of the present disclosure.

FIG. 12 illustrates example operations 1200 for managing at least one data, in accordance with aspects of the present disclosure. The operations 1200 may be performed by a second node that, for example, may provide MC to a UE, such as an MeNB.

The operations 1200 begin, at 1202, by determining a data flow is active for a bearer or a packet data network (PDN) connection. At 1204, the second node decides, based on one or more service requirements of the data flow, whether to serve the data flow at the second node or a first node. At 1206, the second node sends, to the first node, a request for admission of the data flow.

According certain aspects, the request for admission comprises an indication of a protocol layer for aggregation of the data flow. In some cases, the first node and the second node operate using different RATs. In some cases, the data flow comprises a new data flow. In some cases, the second node transmits a configuration which indicates which data flows to report. In some cases, the data flow comprises data for an application. In some cases, the data flow comprises data for a service.

Figure 13:
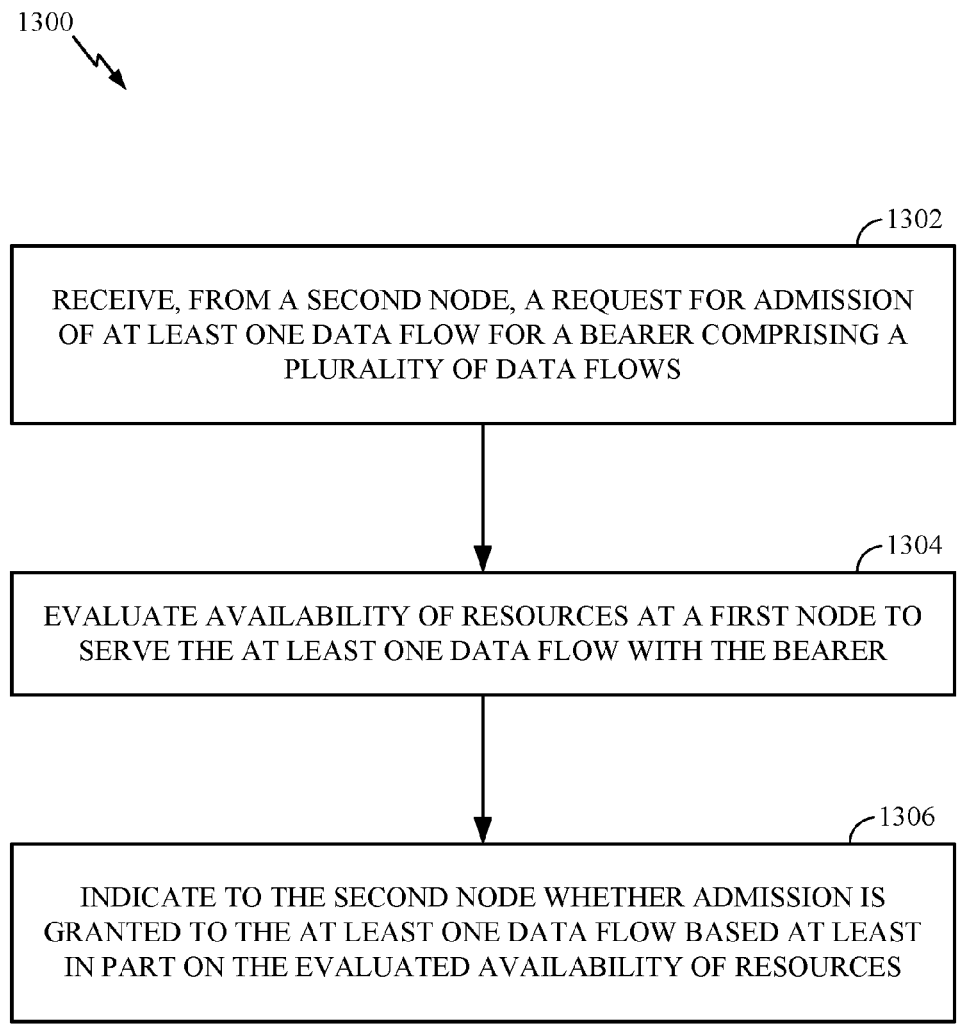
FIG. 13 illustrates example operations for performing admission control on at least one data flow, in accordance with certain aspects of the present disclosure.

FIG. 13 illustrates example operations 1300 for performing admission control on at least one data flow, in accordance with aspects of the present disclosure. The operations 1300 may be performed, by a first node (providing MC to a UE), such as an SeNB.

The operations 1300 begin, at 1302, by receiving, from a second node, a request for admission of the data flow for a bearer comprising a plurality of data flows. At 1304, the first node evaluates availability of resources at the first node to serve the data flow with the bearer. At 1306, the first node indicates to the second node whether admission is granted to the at least one data flow based at least in part on the evaluated availability of resources.

According certain aspects, the request for admission comprises an indication of a protocol layer for aggregation of the data flow. In some cases, the evaluating relates to resources managed by protocol layers below a protocol layer of a flow split or a packet split for aggregation at the first node. In some cases, the first node and the second node operate using different RATs. In some cases, the evaluating availability of resources at the first node to serve the data flow comprises determining resources available to accept data flows from the second node. In some cases, the first may determine that a new data flow is active; and send a message to the second node based on the determination. In some cases, the data flow comprises data for an application. In some cases, the data flow comprises data for a service.

Figure 14:
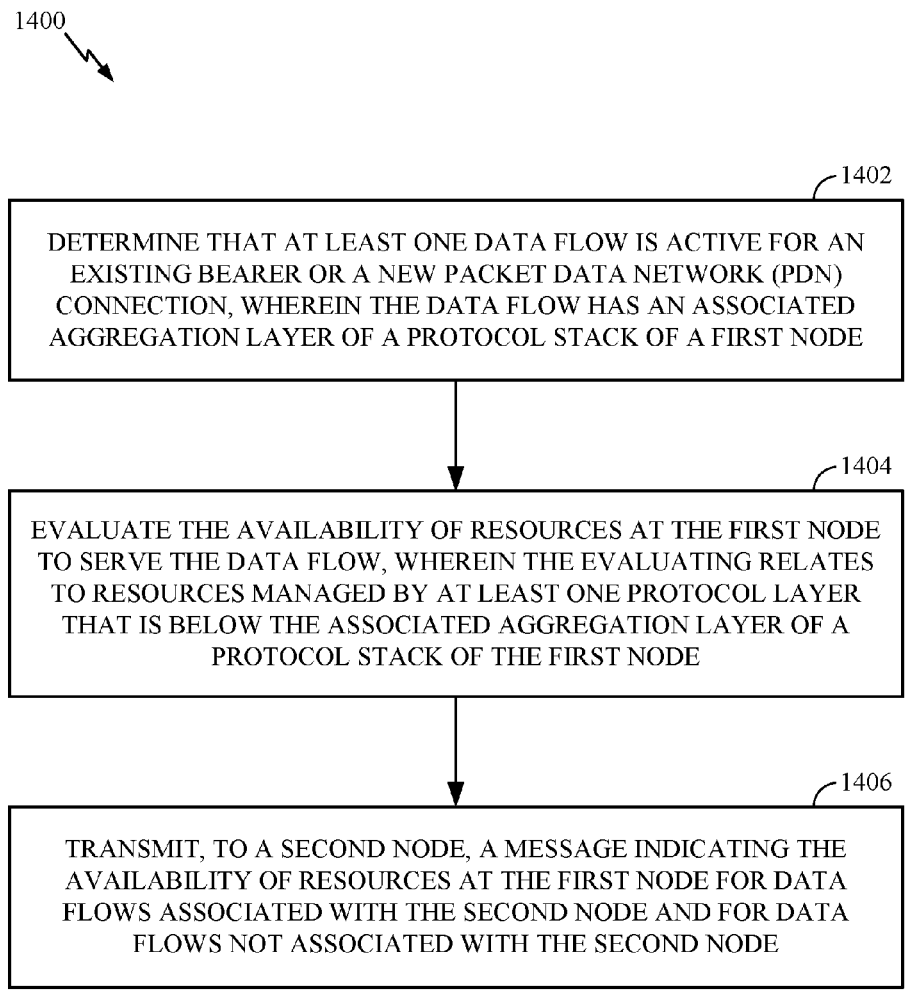
FIG. 14 illustrates example operations for performing load balancing, in accordance with certain aspects of the present disclosure.

FIG. 14 illustrates example operations 1400 for performing load balancing, in accordance with aspects of the present disclosure. The operations 1400 may be performed by a first node, for example, operating as an SeNB.

The operations 1400 begin, at 1402, by the first node determining that at least one data flow is active for an existing bearer or a new packet data network (PDN) connection, wherein the data flow has an associated aggregation layer of a protocol stack of the first node. At 1404, the first node evaluates the availability of resources at the first node to serve the data flow, wherein the evaluating relates to resources managed by at least one protocol layer that is below the associated aggregation layer of a protocol stack of the first node. At 1406, the first node transmits, to a second node, a message indicating the availability of resources at the first node for data flows associated with the second node and for data flows not associated with the second node.

According to certain aspects, the message indicates a need for reducing a resource load on the first node for the at least one data flow. In some cases, the first node may receive a request to terminate serving at least one data flow. In some cases, the first node may receive a request to deactivate a carrier or radio access technology (RAT), wherein active data flows are released via a handover (HO) or a deactivation of the connection with a mobile device associated with the at least one data flow. In some cases, the first node may deactivate a carrier or RAT if no more data flows are served on that carrier or RAT.

In some cases, the evaluating the availability of resources at the first node to serve the data flow comprises comparing a resource load associated with the data flow to a threshold. In some cases, the first node has previously received from the second node a request for admission for the data flow; and the message indicates the availability of resources at the first node for the data flow. In some cases, the data flow includes a new data flow. In some cases, the data flow comprises data for an application. In some cases, the data flow comprises data for a service.

Figure 15:
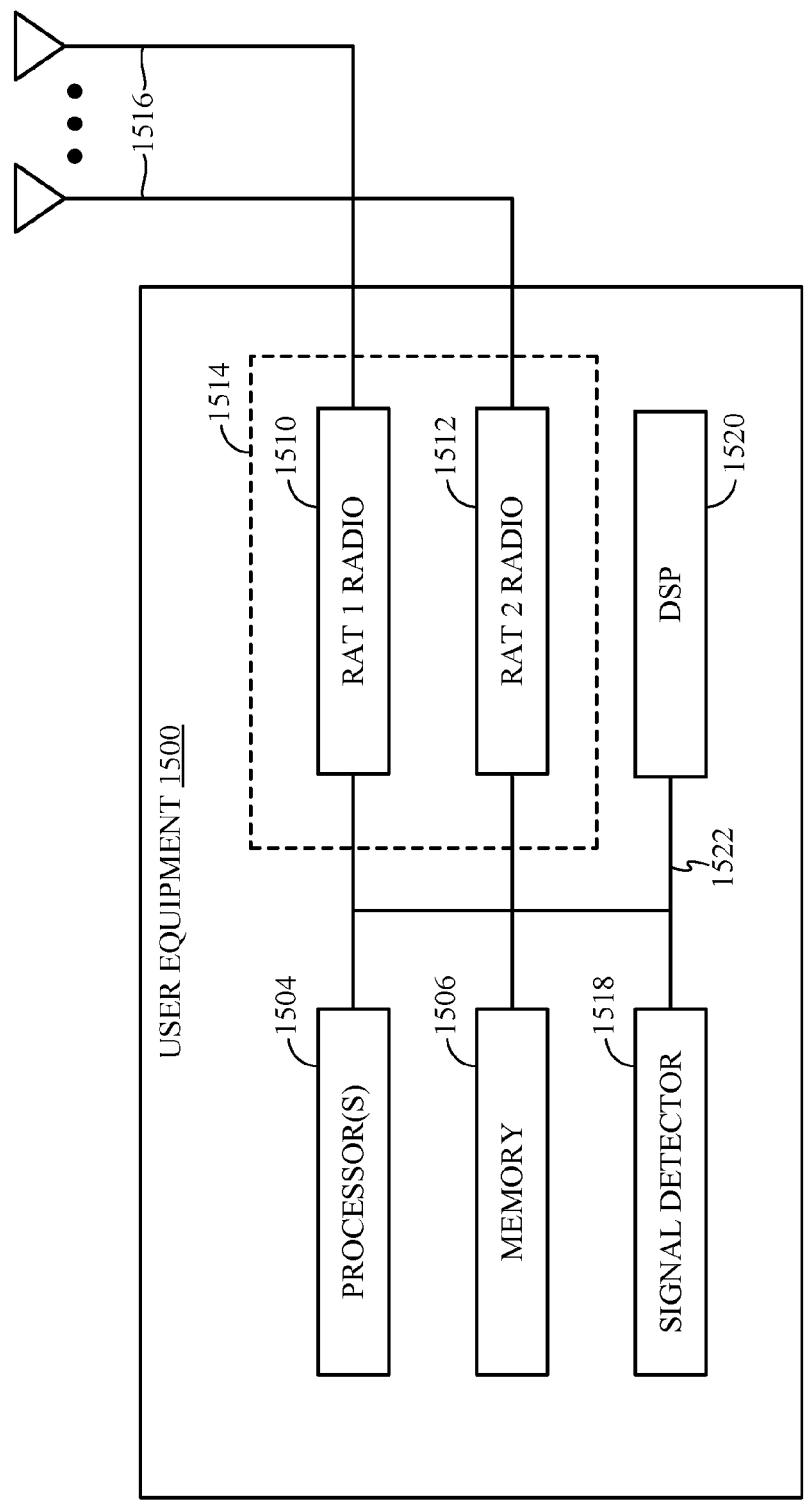
FIG. 15 illustrates a block diagram of an example user equipment, in accordance with aspects of the present disclosure.

FIG. 15 illustrates various components that may be utilized in a MC enabled wireless device 1500 capable of operating in accordance with aspects provided herein. The wireless device 1500 may, for example, be one implementation of UE 110 shown in FIG. 1.

The wireless device 1500 may include one or more processors 1504 which control operation of the wireless device 1500. The processors 1504 may also be referred to as central processing units (CPUs). The processors 1504 may perform, or direct the UE in managing data flows, as described above with reference to FIG. 11. Memory 1506, which may include both read-only memory (ROM) and random access memory (RAM), provides instructions and data to the processors 1504. A portion of the memory 1506 may also include non-volatile random access memory (NVRAM). The processors 1504 typically perform logical and arithmetic operations based on program instructions stored within the memory 1506. The instructions in the memory 1506 may be executable to implement the methods described herein.

The wireless device 1500 may also include radios 1510 and 1512 to communicate via multiple RATs for MC. Each radio may, for example, include a transmitter and receiver, and any other "RF chain" components to allow transmission and reception of data between the wireless device 1500 and different RATs. While two radios are shown for two RATs, as an example only, more than two radios may be included (e.g., to support more than two RATs). Each radio may communicate via a single or a plurality of antennas 1516.

The wireless device 1500 may also include a signal detector 1518 that may be used in an effort to detect and quantify the level of signals received by the transceiver 1514. The signal detector 1518 may detect such signals as total energy, energy per subcarrier per symbol, power spectral density and other signals. The wireless device 1500 may also include a digital signal processor (DSP) 1520 for use in processing signals.

Figure 16:
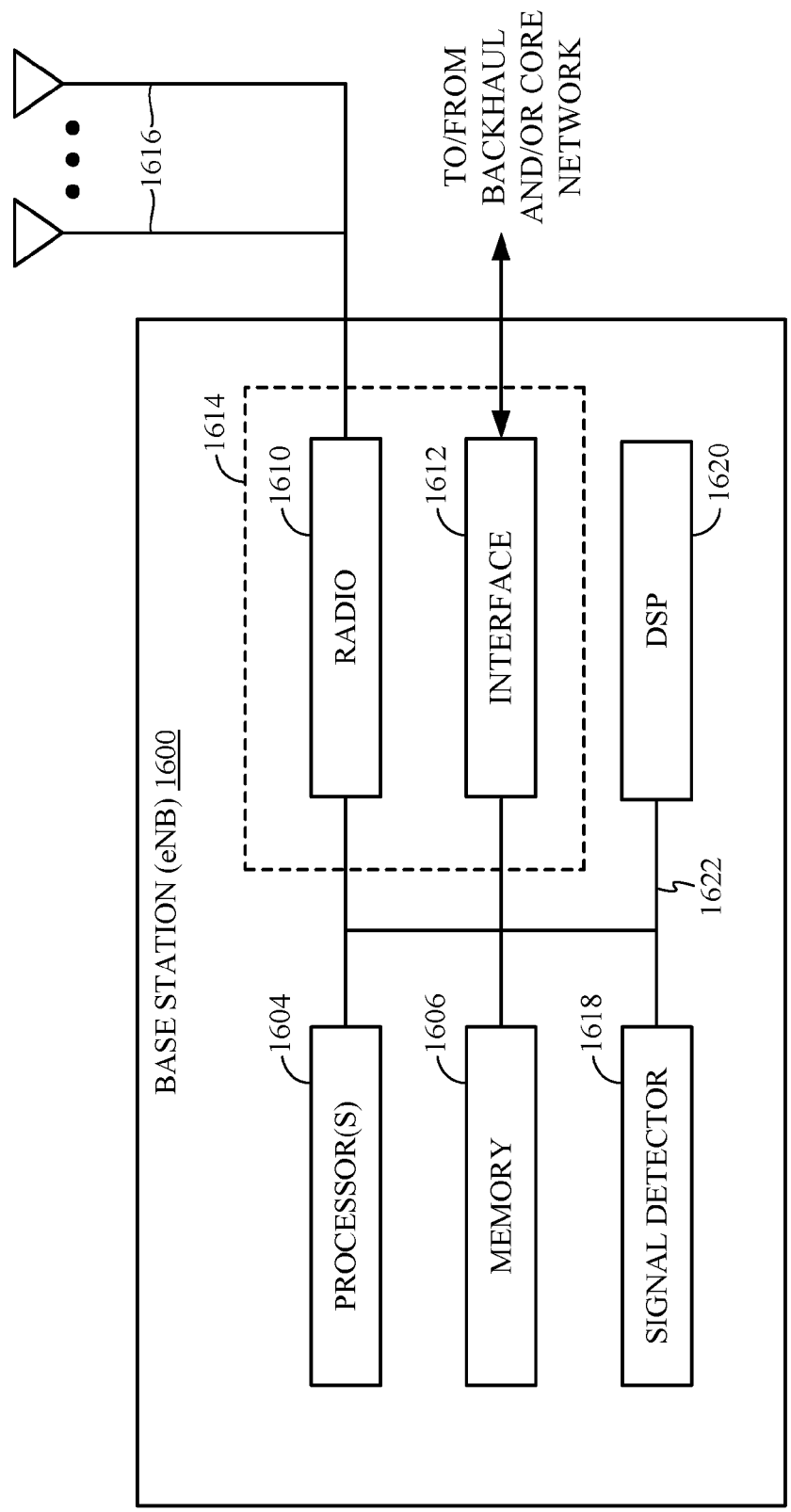
FIG. 16 illustrates a block diagram of an example base station, in accordance with aspects of the present disclosure.

FIG. 16 illustrates various components that may be utilized in a base station 1200 capable of participating in communication with a MC enabled wireless device. The base station 1600 may, for example, be one implementation of MeNB 120 or SeNB 130 shown in FIG. 1.

The base station 1600 may include one or more processors 1604 which control operation of the base station 1600. The processors 1604 may also be referred to as central processing units (CPUs). The processors 1604 may manage data or perform admission control or load balancing, as described above with reference to FIGS. 12-14. Memory 1606, which may include both read-only memory (ROM) and random access memory (RAM), provides instructions and data to the processors 1604. A portion of the memory 1606 may also include non-volatile random access memory (NVRAM). The processors 1604 typically perform logical and arithmetic operations based on program instructions stored within the memory 1606. The instructions in the memory 1606 may be executable to implement the methods described herein (e.g., for MeNBs and SeNBs serving a DC UE), such as managing data or performing admission control or load balancing, as described above with reference to FIGS. 12-14.

The base station 1600 may also include one or more radios 1610, for example to communicate with a UE via one or more RATs. Each radio may, for example, include a transmitter and receiver, and any other "RF chain" components to allow transmission and reception of data between the base station 1600 and different UEs. Each radio may communicate via a single or a plurality of antennas 1616. The base station 1600 may also include an interface 1612 for communicating with other base stations (e.g., via an X2 backhaul connection) or a core network (e.g., via an S1 connection).

The base station 1600 may also include a signal detector 1618 that may be used in an effort to detect and quantify the level of signals received by the transceiver 1614. The signal detector 1618 may detect such signals as total energy, energy per subcarrier per symbol, power spectral density and other signals. The base station 1600 may also include a digital signal processor (DSP) 1620 for use in processing signals.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a second node for managing a data flow, comprising:

receiving an indication of one or more service requirements of the data flow that is active for a bearer or a packet data network (PDN) connection;

deciding, based on the one or more service requirements of the data flow, whether to serve the data flow at the second node or a first node; and sending, to the first node, a request for admission of the data flow based on the decision, wherein the request for admission comprises an indication of a protocol layer for aggregation of the data flow.

2. The method of claim 1, wherein the first node and the second node operate using different radio access technologies (RATs).

3. The method of claim 1, wherein the data flow comprises a new data flow.

4. The method of claim 1, further comprising transmitting a configuration which indicates which data flows to report.

5. The method of claim 1, wherein the data flow comprises data for an application.

6. The method of claim 1, wherein the data flow comprises data for a service.

7. A second node for managing a data flow, comprising:

means for receiving an indication of one or more service requirements of the data flow that is active for a bearer or a packet data network (PDN) connection;

means for deciding, based on the one or more service requirements of the data flow, whether to serve the data flow at the second node or a first node; and means for sending, to the first node, a request for admission of the data flow based on the decision, wherein the request for admission comprises an indication of a protocol layer for aggregation of the data flow.

8. The second node of claim 7, wherein the first node and the second node operate using different radio access technologies (RATs).

9. The second node of claim 7, wherein the data flow comprises a new data flow.

10. The second node of claim 7, further comprising means for transmitting a configuration which indicates which data flows to report.

11. The second node of claim 7, wherein the data flow comprises data for an application.

12. The second node of claim 7, wherein the data flow comprises data for a service.

13. A non-transitory computer-readable medium for managing a data flow having instructions stored thereon, to be executed by a processor, for causing a second node to:

receive an indication of one or more service requirements of the data flow that is active for a bearer or a packet data network (PDN) connection;

decide, based on the one or more service requirements of the data flow, whether to serve the data flow at the second node or a first node; and send, to the first node, a request for admission of the data flow based on the decision, wherein the request for admission comprises an indication of a protocol layer for aggregation of the data flow.

* * * * *